US012672117B2

(12) United States Patent
Bhamri et al.

(10) Patent No.: US 12,672,117 B2
(45) Date of Patent: Jun. 30, 2026

(54) APPLYING IRREGULAR SUBCARRIER SPACING

(71) Applicant: Lenovo (Singapore) PTE. LTD., New Tech Park (SG)

(72) Inventors: Ankit Bhamri, Rödermark (DE); Ali Ramadan Ali, Kraiburg am Inn (DE); Karthikeyan Ganesan, Kronberg im Taunus (DE); Alexander Johann Maria Golitschek Edler von Elbwart, Darmstadt (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 456 days.

(21) Appl. No.: 17/914,730

(22) PCT Filed: Mar. 25, 2021

(86) PCT No.: PCT/IB2021/052502
§ 371 (c)(1),
(2) Date: Sep. 26, 2022

(87) PCT Pub. No.: WO2021/191845
PCT Pub. Date: Sep. 30, 2021

(65) Prior Publication Data
US 2023/0109827 A1 Apr. 13, 2023

Related U.S. Application Data

(60) Provisional application No. 63/007,310, filed on Apr. 8, 2020, provisional application No. 62/994,637, filed on Mar. 25, 2020.

(51) Int. Cl.
H04L 27/26 (2006.01)
H04L 5/00 (2006.01)
H04W 72/0453 (2023.01)

(52) U.S. Cl.
CPC ....... H04W 72/0453 (2013.01); H04L 5/0092 (2013.01); H04L 27/26025 (2021.01)

(58) Field of Classification Search
CPC ... H04L 5/0039; H04L 5/0048; H04L 5/0055; H04L 5/0094; H04L 27/2666; H04W 56/0005; H04W 72/23; H04W 72/04
(Continued)

(56) References Cited

U.S. PATENT DOCUMENTS 12,495,403 B2 12/2025 Ali et al.
2019/0090161 A1* 3/2019 Fan ........................ H04W 72/04
(Continued)

FOREIGN PATENT DOCUMENTS

WO 2016004634 A1 1/2016
WO 2017073084 A1 5/2017
WO 2018064403 A1 4/2018

OTHER PUBLICATIONS

Nokia, Nokia Shanghai Bell, "On uplink signal and channel structures for NR-U", 3GPP TSG RAN WG1 Meeting #95 R1-1812660, Nov. 12-16, 2018, pp. 1-18.
(Continued)

*Primary Examiner* — Harun Chowdhury
(74) *Attorney, Agent, or Firm* — Kunzler Needham Hilton

(57) ABSTRACT

Apparatuses, methods, and systems are disclosed for supporting irregular subcarrier spacing. One apparatus includes a transceiver and a processor that receives an indication of at least one value of irregular subcarrier spacing. The processor controls the transceiver to communicate with a Radio Access Network ("RAN") by applying the indicated irregular subcarrier spacing to resource elements ("REs") in multiple physical resource block groups ("PRGs").

20 Claims, 12 Drawing Sheets

(58) Field of Classification Search
USPC .......................................... 370/252, 329, 350
See application file for complete search history.

(56) References Cited

U.S. PATENT DOCUMENTS

| | | | | |
|---|---|---|---|---|
| 2019/0150132 A1* | 5/2019 | Bala | ...................... | H04W 72/23 |
| | | | | 370/329 |
| 2019/0229867 A1* | 7/2019 | Yi | ......................... | H04L 5/0048 |
| 2019/0306860 A1* | 10/2019 | Ciochina | ............. | H04L 27/2666 |
| 2019/0357239 A1 | 11/2019 | Moon et al. | | |
| 2020/0015223 A1 | 1/2020 | Matsumura et al. | | |

OTHER PUBLICATIONS

Qualcomm, "New WID on Extending current NR operation to 71 GHz", 3GPP TSG RAN Meeting #86 RP-193229, Dec. 9-12, 2019, pp. 1-5.

Intel Corporation, "New SID: Study on supporting NR from 52.6GHz to 71 GHz", 3GPP TSG RAN Meeting #86 RP-193259, Dec. 9-12, 2019, p. 1-3.

PCT/IB2021/052502, "Notification of Transmittal of the International Search Report and the Written Opinion of the International Searching authority, or the Declaration", International Searching Authority, Jun. 28, 2021, pp. 1-13.

3GPP, "3rd Generation Partnership Project; Technical Specification Group Radio Access Network; NR; Physical channels and modulation (Release 16)", 3GPP TS 38.211 V16.0.0, Dec. 2019, pp. 1-129.

3GPP, 3rd Generation Partnership Project; Technical Specification Group Radio Access Network; NR; Physical layer procedures for data (Release 16), 3GPP TS 38.214 V16.0.0, Dec. 2019, p. 1-147.

3GPP, 3rd Generation Partnership Project; Technical Specification Group Radio Access Network; Evolved Universal Terrestrial Radio Access (E-UTRA); Physical layer procedures (Release 16), 3GPP TS 36.213 V16.1.0, Mar. 2020.

U.S. Appl. No. 17/914,705, "Office Action Summary", US Patent and Trademark Office, Feb. 13, 2025, pp. 1-20.

* cited by examiner

1100

Start

1105 — Receive an indication of at last one value of irregular subcarrier spacing 1110 — Communicate with a RAN by applying the indicated irregular subcarrier spacing to REs in multiple PRGs End

APPLYING IRREGULAR SUBCARRIER SPACING

CROSS-REFERENCE TO RELATED APPLICATIONS

This application claims priority to U.S. Provisional Patent Application No. 63/007,310 entitled "IRREGULAR SUB-CARRIER SPACING FOR PHASE NOISE" and filed on Apr. 8, 2020 for Ankit Bhamri, Ali Ramadan Ali, Karthikeyan Ganesan, Alexander Johann Maria Golitschek Edler von Elbwart, and Vijay Nangia, which application is incorporated herein by reference. This application also claims priority to U.S. Provisional Patent Application No. 62/994,637 entitled "IRREGULAR RESOURCE ELE-MENT MAPPING" and filed on Mar. 25, 2020 for Ali Ramadan Ali, Ankit Bhamri, Alexander Johann Maria Golitschek Edler von Elbwart, Karthikeyan Ganesan, and Vijay Nangia, which application is also incorporated herein by reference.

FIELD

The subject matter disclosed herein relates generally to wireless communications and more particularly relates to irregular subcarrier spacing, for example, PRG-based irregular is subcarrier spacing.

BACKGROUND

In certain wireless communication systems, communication is supported on high-frequency radio bands, such as 52.6 GHz to 71 GHz. However, phase noise at such frequencies causes higher inter-carrier interference ("ICI").

BRIEF SUMMARY

Disclosed are procedures for supporting irregular subcarrier spacing. Said procedures may be implemented by apparatus, systems, methods, or computer program products.

One method of a User Equipment device ("UE") includes receiving, at a UE an indication of at least one value of irregular subcarrier spacing and communicating with a Radio Access Network ("RAN") by applying the indicated irregular subcarrier spacing ("SCS") to resource elements ("REs") in multiple physical resource block groups ("PRGs").

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
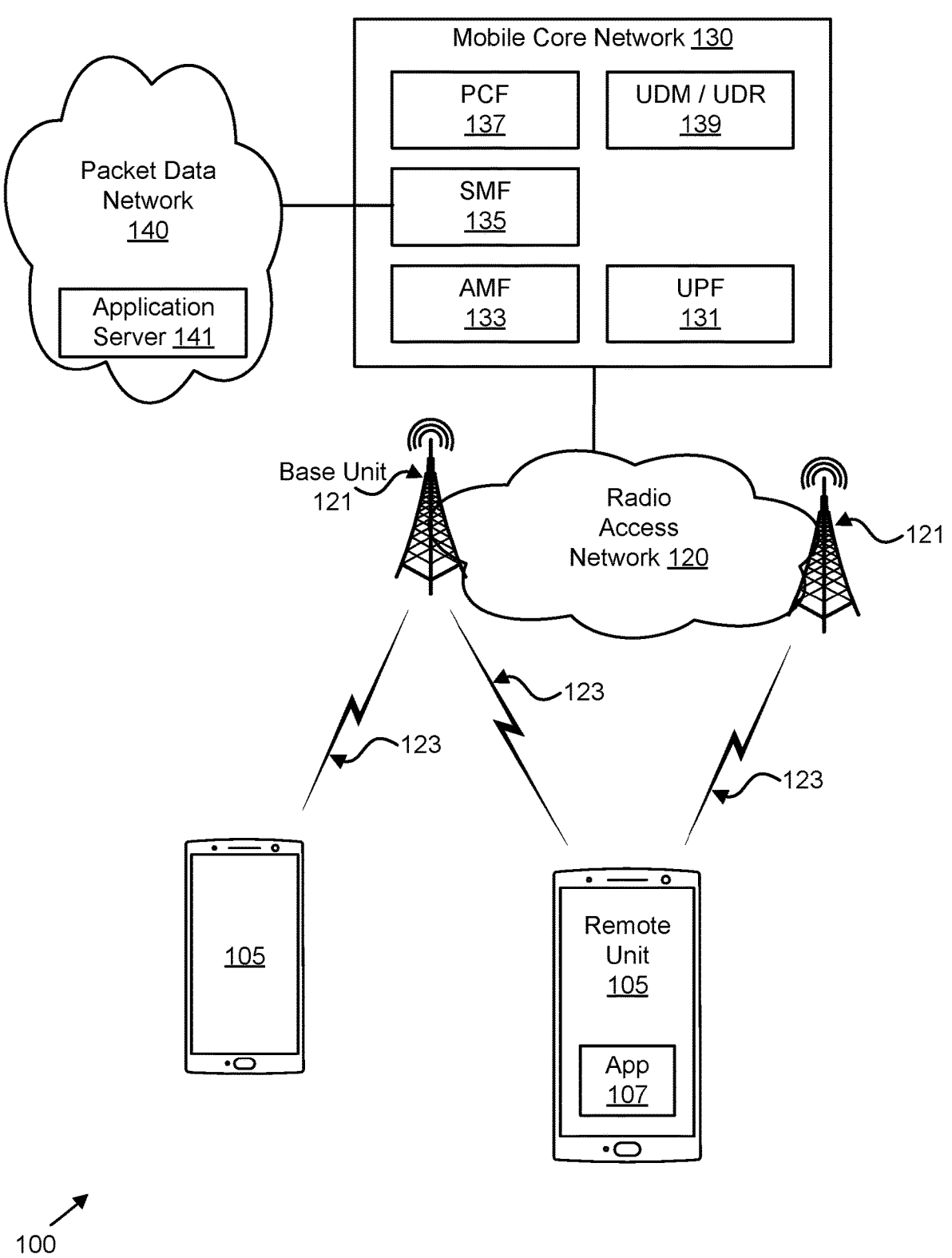
FIG. 1A is a schematic block diagram illustrating one embodiment of a wireless communication system for irregular subcarrier spacing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting irregular subcarrier spacing. In various embodiments, NR existing DL and UL waveforms may be adapted to support operation between 52.6 GHz and 71 GHz. For example, applicable numerology (including subcarrier spacing) and/or channel bandwidth (including maximum bandwidth) may be adapted for operation at the higher-frequency ranges (e.g., 52.6 GHz to 71 GHz). In various embodiments, physical layer aspects may be adapted including the use of new numerology or numerologies, such as 480kHz and 960kHz, ($\mu$ value in 3GPP TS 38.211) for operation in this frequency range.

Disclosed herein are solutions for mitigating the impact of high SCS on the system design. More specifically, the disclosed solutions mitigate the impact of phase noise which is more prominent near the DC subcarrier. To deal with inter-carrier interference ("ICI") caused by phase noise at high frequencies, high subcarrier spacing is required. However, increasing the subcarriers spacing has an impact on the physical layer channels structure and signaling. For example, as the symbol length is reduced by factor of two (2) for doubling the subcarrier spacing, an increase of cyclic prefix ("CP") overhead is required to cope with multipath effect in some scenarios. Also, the number of Hybrid Automatic Repeat Request ("HARQ") processes would increase due to the shortened Transmission Time Interval ("TTI") length (scheduling unit referring to the duration of a transmission on the radio link).

FIG. 1A depicts a wireless communication system 100 for supporting irregular subcarrier spacing, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 130 are depicted in FIG. 1A, one of skill in the art will recognize that any number of remote units 105, base units 121, wireless communication links 123, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 141 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 141 in the packet data network 140 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 140. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 140, like the Internet and private data networks, among other data networks. A remote unit 105 may have a subscription or other account with the mobile core network 130. Each mobile core network 130 belongs to a single PLMN. The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, and a Unified Data Management function ("UDM"). In some embodiments, the UDM is co-located with a User Data Repository ("UDR"), depicted as combined entity "UDM/UDR" 139. In various embodiments, the mobile core network 130 may also include an Authentication Server Function ("AUSF"), a Network Repository Function ("NRF") (used by the various NFs to discover and communicate with each other over Application Programming Interfaces ("APIs")), or other NFs defined for the SGC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1A for ease of illustration, but their support is assumed.

Although specific numbers and types of network functions are depicted in FIG. 1A, one of skill in the art will recognize that any number and type of network functions may be included in the mobile core network 130. Moreover, in an LTE variant where the mobile core network 130 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1A depicts components of a 5G RAN and a 5G core network, the described embodiments for supporting irregular subcarrier spacing apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting irregular subcarrier spacing.

Figure 1B:
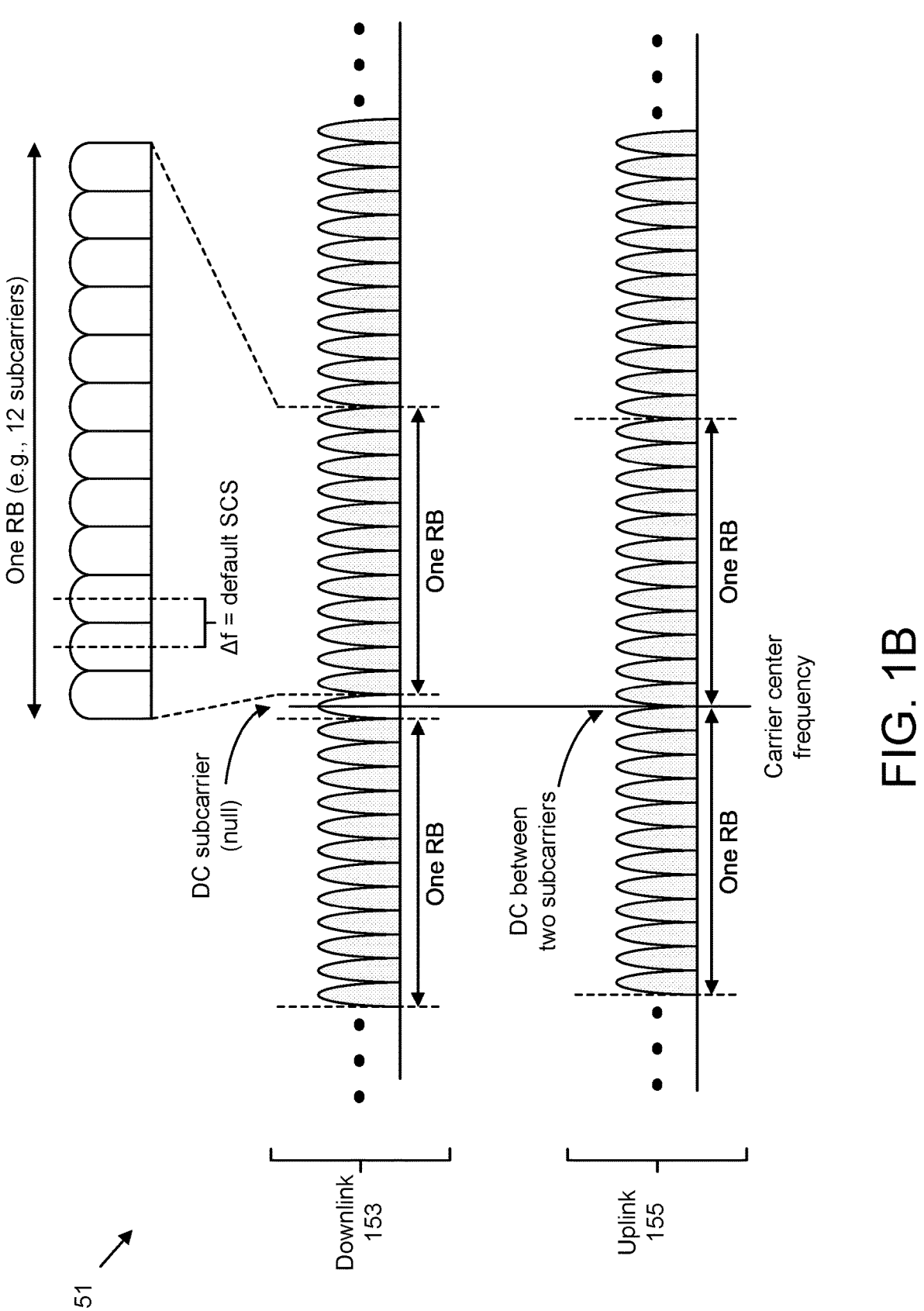
FIG. 1B is a diagram illustrating one embodiment of OFDM subcarriers.

FIG. 1B depicts one example of sets 151 of Orthogonal Frequency Division Multiplexing ("OFDM") subcarriers on downlink 153 and uplink 155 frequency bands. The carrier bandwidth is divided into a plurality of subcarriers having orthogonal spacing in the frequency domain to prevent intercarrier interference. The subcarriers may then be grouped into Physical Resource Blocks ("PRBs"). In the depicted example, one Physical Resource Block ("PRB") consists of 12 subcarriers. Note that on the downlink ("DL") there is an empty subcarrier at the carrier center frequency, referred to as the DC subcarrier. As used herein, an empty subcarrier (also known as a "null" subcarrier) is a subcarrier where no transmission is made. In contrast, on the uplink ("UL") the subcarriers are shifted in frequency by one-half ("½") of the subcarrier spacing, therefore the DC (i.e., carrier center frequency) is located between two UL subcarriers. The spacing between subcarrier center frequencies is denoted Afc, which is the default subcarrier spacing for the wideband carrier.

Multiple OFDM numerologies are supported as given by Table 1 where μ and the cyclic prefix for a downlink or uplink bandwidth part are obtained from the higher-layer parameter subcarrierSpacing and cyclicPrefix, respectively. In Table 1, Δf is the default subcarrier spacing for the OFDM numerology.

TABLE 1

Supported transmission numerologies.

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding the resource grid, for each numerology and carrier, a resource grid of $$N_{grid,x}^{size,\mu} N_{sc}^{RB}$$

subcarriers and $$N_{symb}^{subframe,\mu}$$

OFDM symbols is defined, starting at common resource block $$N_{grid}^{start,\mu}$$

indicated by higher-layer signaling. There is one set of resource grids per transmission direction (uplink, downlink, or sidelink) with the subscript x set to DL, UL, and SL for downlink, uplink, and sidelink, respectively. When there is no risk for confusion, the subscript x may be dropped. There is one resource grid for a given antenna port p, subcarrier spacing configuration μ, and transmission direction (downlink, uplink, or sidelink).

For uplink and downlink, the carrier bandwidth $$N_{grid}^{size,\mu}$$

for subcarrier spacing configuration μ is given by the higher-layer parameter carrierBandwidth in the SCS-SpecificCarrier IE. The starting position $$N_{grid}^{start,\mu}$$

for subcarrier spacing configuration μ is given by the higher-layer parameter offsetToCarrier in the SCS-SpecificCarrier IE. The frequency location of a subcarrier refers to the center frequency of that subcarrier. Note that the DC subcarrier refers to the subcarrier with a 0 Hz offset from the carrier center frequency.

Regarding resource elements, each element in the resource grid for antenna port p and subcarrier spacing configuration μ called a resource element and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $$a_{k,l}^{(p,\mu)}.$$

When there is no risk for confusion, or no particular antenna port or subcarrier spacing is specified, the indices p and μ may be dropped, resulting in $$a_{k,l}^{(p)}$$

or $a_{k,l}$.

Regarding the mapping of PRBs to virtual resource block, the mapping to resource elements $(k', l)_{p,\mu}$ allocated for PDSCH and not reserved for other purposes is to be in increasing order of first the index k' over the assigned virtual resource blocks, where k'=0 is the first subcarrier in the lowest-numbered virtual resource block assigned for transmission, and then the index l.

In some embodiments, the Radio Access (i.e., air interface) supports irregular subcarrier spacing or irregular allocation of resources in frequency domain such that the PRBs close to the DC subcarrier have a higher spacing (frequency offset, Δf) and the spacing is reduced for allocation farther away from the DC subcarrier. However, such a scheme may result in misalignment on how the PRBs within a Precoding Resource Block Group ("PRG") are scheduled.

Regarding physical resource block ("PRB") bundling, the PRB bundling procedures for Physical Downlink Shared Channel ("PDSCH") scheduled by Physical Downlink Control Channel ("PDCCH") with Downlink Control Information ("DCI") format 1_1 described here equally apply to PDSCH scheduled by PDCCH with DCI format 1_2, by applying the parameters of prb-BundlingType-ForDCIFormat1_2 instead of prb-BundlingType as well as vrb-ToPRB-Interleaver-ForDCIFormat1_2 instead of vrb-ToPRB-Interleaver.

A UE may assume that precoding granularity is $P'_{BWP,i}$ consecutive resource blocks in the frequency domain. $P'_{BWP,i}$ can be equal to one of the values among {2, 4, wideband}.

If $P'_{BWP,i}$ is determined as "wideband", the UE is not expected to be scheduled with non-contiguous PRBs and the UE may assume that the same precoding is applied to the allocated resource.

If $P'_{BWP,i}$ is determined as one of the values among {2, 4}, Precoding Resource Block Group (PRGs) partitions the bandwidth part i with $P'_{BWP,i}$ consecutive PRBs. Actual number of consecutive PRBs in each PRG could be one or more.

Figure 2:
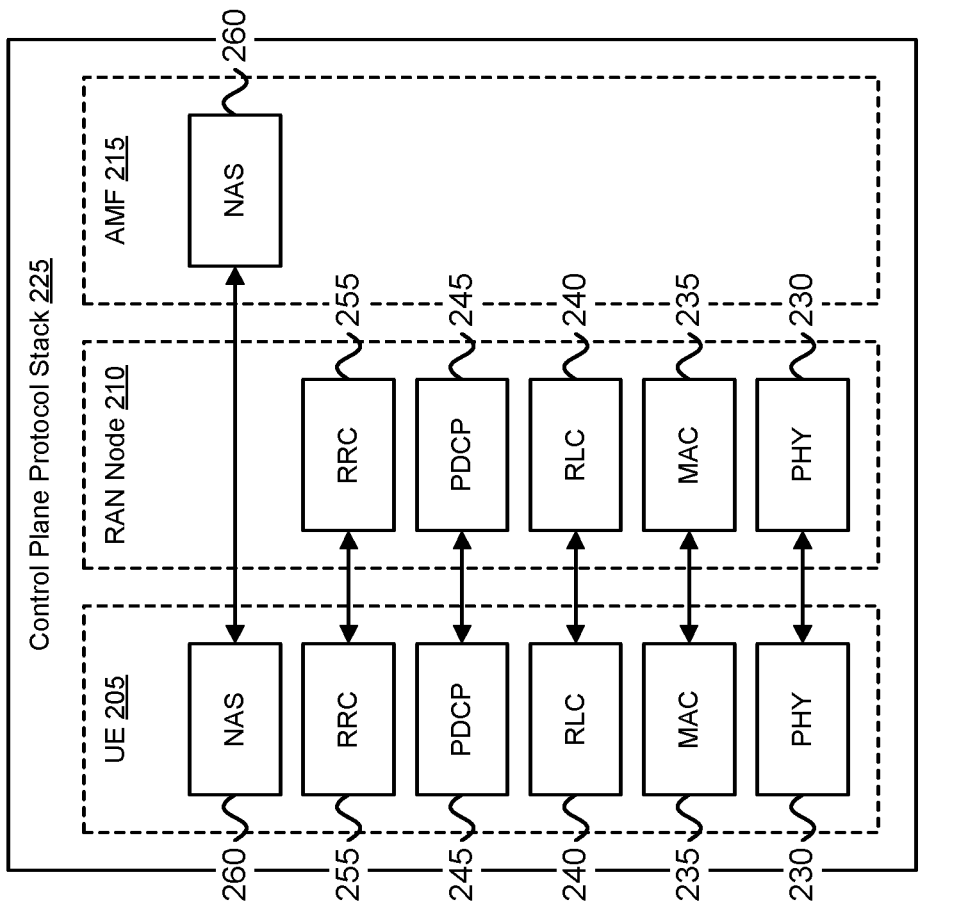
FIG. 2 is a block diagram illustrating one embodiment of a Fifth-Generation ("5G") New Radio ("NR") protocol stack.
Figure 2:
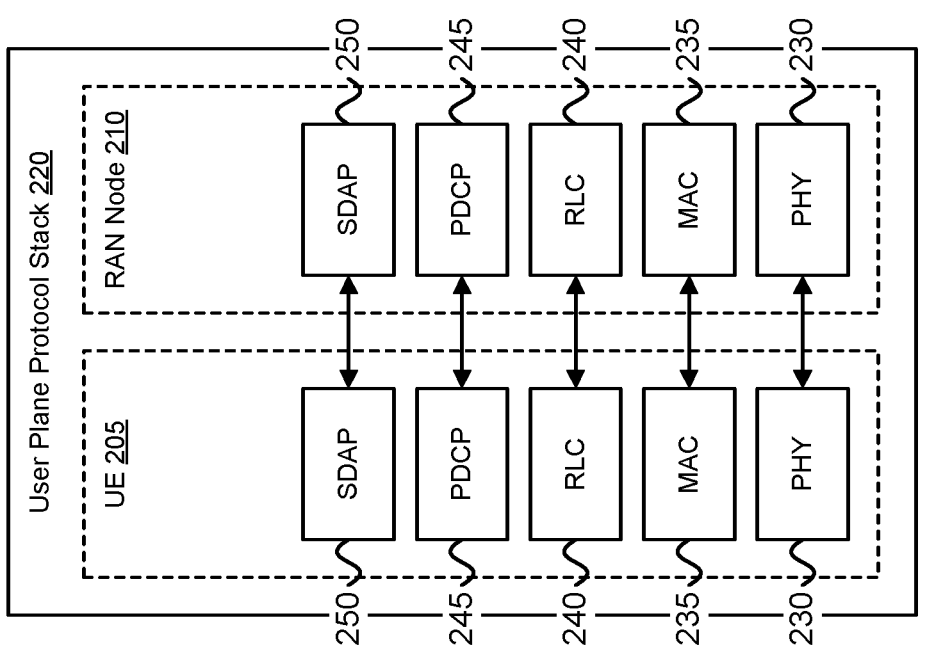

FIG. 2 depicts a NR protocol stack 200, according to embodiments of the disclosure. While FIG. 2 shows a UE 205, a RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 220 and a Control Plane protocol stack 225. The User Plane protocol stack 220 includes a physical ("PHY") layer 230, a Medium Access Control ("MAC") sublayer 235, the Radio Link Control ("RLC") sublayer 240, a Packet Data Convergence Protocol ("PDCP") sublayer 245, and Service Data Adaptation Protocol ("SDAP") layer 250. The Control Plane protocol stack 225 includes a physical layer 230, a MAC sublayer 235, a RLC sublayer 240, and a PDCP sublayer 245. The Control Plane protocol stack 225 also includes a Radio Resource Control ("RRC") layer 255 and a Non-Access Stratum ("NAS") layer 260.

The AS layer (also referred to as "AS protocol stack") for the User Plane protocol stack 220 consists of at least SDAP, PDCP, RLC and MAC sublayers, and the physical layer. The AS layer for the Control Plane protocol stack 225 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 255 and the NAS layer 260 for the control plane and includes, e.g., an Internet Protocol ("IP") layer or PDU Layer (not depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The physical layer 230 may perform CCA/LBT procedure as described herein. In certain embodiments, the physical layer 230 may send a notification of UL LBT failure to a MAC entity at the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC). The RRC layer 255 provides for the addition, modification, and release of Carrier Aggregation and/or Dual Connectivity. The RRC layer 255 also manages the establishment, configuration, maintenance, and release of Signaling Radio Bearers ("SRBs") and Data Radio Bearers ("DRBs").

The NAS layer 260 is between the UE 205 and the 5GC 215. NAS messages are passed transparently through the RAN. The NAS layer 260 is used to manage the establishment of communication sessions and for maintaining continuous communications with the UE 205 as it moves between different cells of the RAN. In contrast, the AS layer is between the UE 205 and the RAN carries information over the wireless portion of the network.

Figure 3:
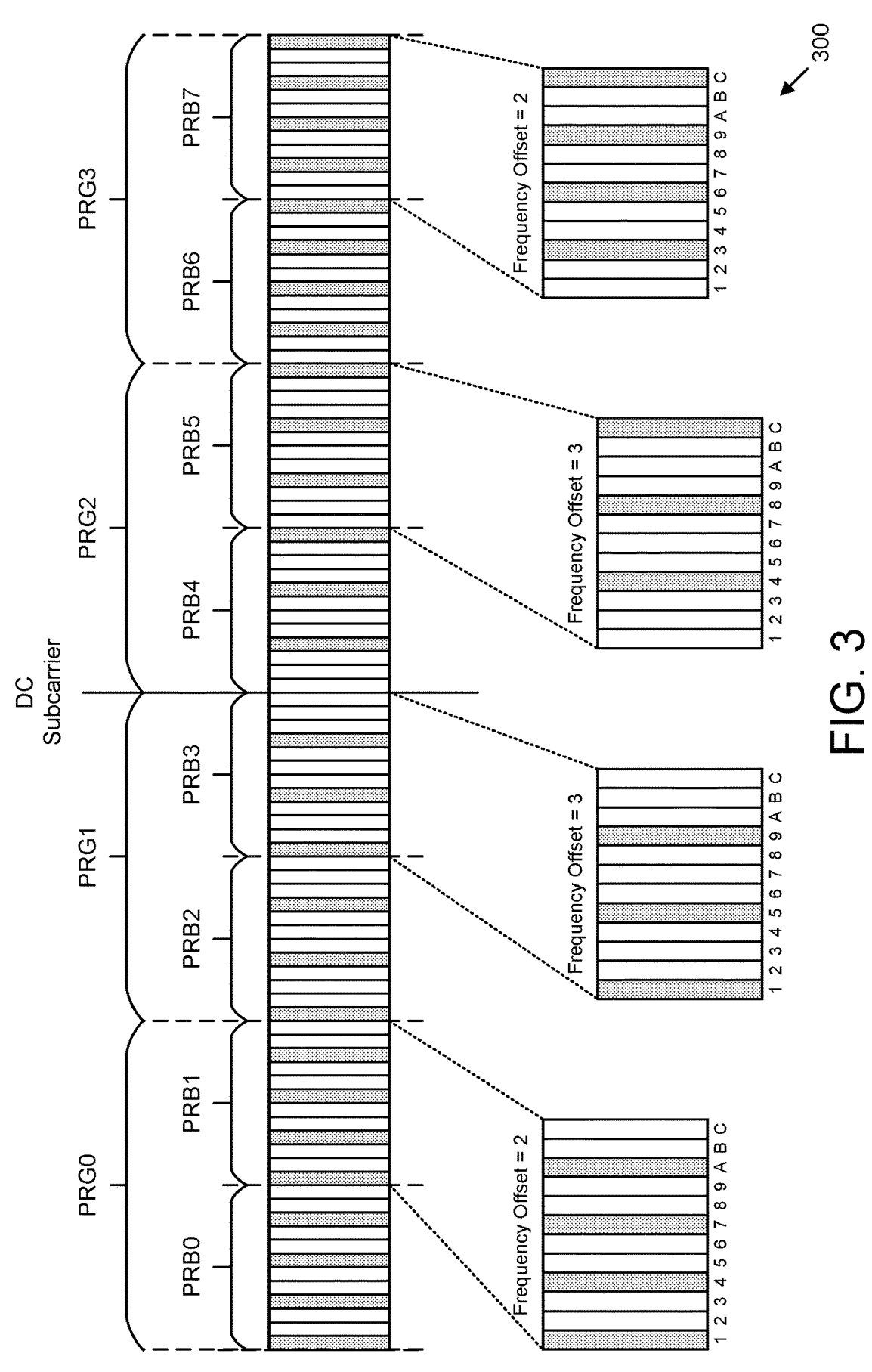
FIG. 3 is a diagram illustrating one embodiment of frequency offset values across different sets of PRGs (equal size) for entire allocation, showing an even number of PRGs.

FIG. 3 depicts a first arrangement 300 of irregular subcarrier spacing on an uplink ("UL") carrier, wherein a pattern of active and null subcarriers achieve frequency offset values across different sets of Physical Resource Block Groups ("PRGs", also referred to as "Precoding Resource block Groups"). In the depicted arrangement 300, the white-filled REs indicate empty REs and the gray-colored REs represent occupied REs. As depicted, the frequency offset (indicating the pattern of empty/null subcarriers and occupied subcarriers) may be the same for all PRBs in a PRGs. In some embodiments, the irregular subcarrier spacing is applied to all PRGs allocated to the UE 205. In other embodiments, the irregular subcarrier spacing is applied to only a portion of the PRGs allocated to the UE 205.

Each PRG comprises multiple PRBs. While the depicted embodiment shows a PRG containing two (2) PRBs, in other embodiments a PRG may contain one PRB or more than two PBRs. Note, however, that all PRGs in the wideband carrier have the same number of PBRs. Additionally, while the depicted embodiment shows each PRB containing twelve (12) REs, in other embodiments each PRB may contain more (or fewer) REs.

Because the phase noise effect/spectrum is decreased with increasing the frequency offset from the center frequency, irregular or interleaved baseband subcarrier mapping with lower SCS is supported, such that subcarriers close to the DC are mapped with a frequency offset, i.e., by leaving empty REs to generate higher spacing between carriers than that produced by the default SCS (i.e., Δf in FIG. 1B). Additionally, the spacing between the subcarriers may be reduced moving away from the DC subcarrier. This may be achieved by decreasing the number of empty/null subcarriers between successive occupied subcarriers in PRGs further away from the DC subcarrier. In some embodiments, the spacing/frequency offset between subcarriers with actual transmission is applied in multiples (i.e., sets) of PRGs to prevent misalignment in terms of resource allocation for PRBs within a PRG. FIG. 3 depicts one example of this principle, where each frequency offset value (i.e., indicating the pattern of empty and occupied REs) is applied to a set of multiple PRGs.

Phase noise is a multiplicative noise process with time-domain signal, and the inter-carrier interference ("ICI") created on OFDM subcarriers with a sufficient number of neighbor subcarriers (dependent of subcarrier spacing) is expected to be similar. At near the band/carrier edge or resource allocation edge (for example in uplink) due to fewer surrounding subcarriers, the ICI is expected to be lower. Thus, subcarriers closer to the center of the band or carrier or allocation (denoted "band/carrier/allocation") may use a larger spacing between occupied subcarriers compared to subcarriers near the band/carrier/allocation edge. This irregular subcarrier mapping can result in a lower overhead compared to interleaved and/or equally-spaced subcarrier mapping.

According to a first solution, if multiple values of irregular subcarrier spacing or frequency offset are configured or indicated to the UE 205 and if PRG size is determined as one of the values that is not wideband, then only a single frequency offset value is applied to multiples of PRG. In other words, a single PRG cannot have more than one value of frequency offset.

In one example implementation of the first solution, a UE 205 may be configured and/or indicated with a set 'M'=$\{M_1, \ldots, M_m\}$ of 'm' values of frequency offset and a total 'N' number of PRGs are allocated to a UE 205, then the first value $M_1$ in set 'M' is associated/assigned to the first set of (ceiling function) [N/m] PRGs closest to the DC subcarrier (i.e., PRG1 and PRG2 in this example). The second value $M_2$ in set 'M' is associated to second set of (floor function)

[N/m] adjacent PRGs further away from the DC subcarrier (i.e., PRG0 and PRG3 in this example), and so on. In this case, all the allocated PRGs are associated with a frequency offset value.

For the arrangement 300 of FIG. 3, the parameters indicated to the UE 205 include: M=$\{3,2\}$, N=$\{4\}$, where $N_1$=PRG1, PRG2 and $M_1$=3, and where $N_2$=PRG0, PRG3 and $M_2$=2. Here, the UE 205 is allocated four PRGs and the irregular subcarrier spacing is applied to all the four allocated PRGs (i.e., because N=4). In the arrangement 300, different frequency offset values are applied across different sets of PRGs, where the sets of PRGs are of equal size (i.e., the irregular subcarrier spacing is applied to an even number of PRGs).

As shown in FIG. 3, for M=$\{3,2\}$ and N=$\{4\}$, the first 2 PRGs close to the DC subcarrier are associated with frequency offset value 3 and the second 2 PRGs are associated with the frequency offset value 2. For PRG1 and PRG2, the frequency offset value of '3' is applied, such that only 3 REs are occupied, and the other REs are empty. Note that the pattern of empty/occupied REs in PRG1 is a mirror of the pattern in PRG2, where in each PRB the REs closest to the DC subcarrier are empty, such that the REs immediately adjacent to the DC subcarrier are empty. For PRG0 and PRG3, the frequency offset value of '2' is applied, such that only 4 REs are occupied, and the other REs are empty. Note that the pattern of empty/occupied REs in PRG0 is a mirror of the pattern in PRG3, where in each PRB the REs closest to the DC subcarrier are empty.

Figure 4:
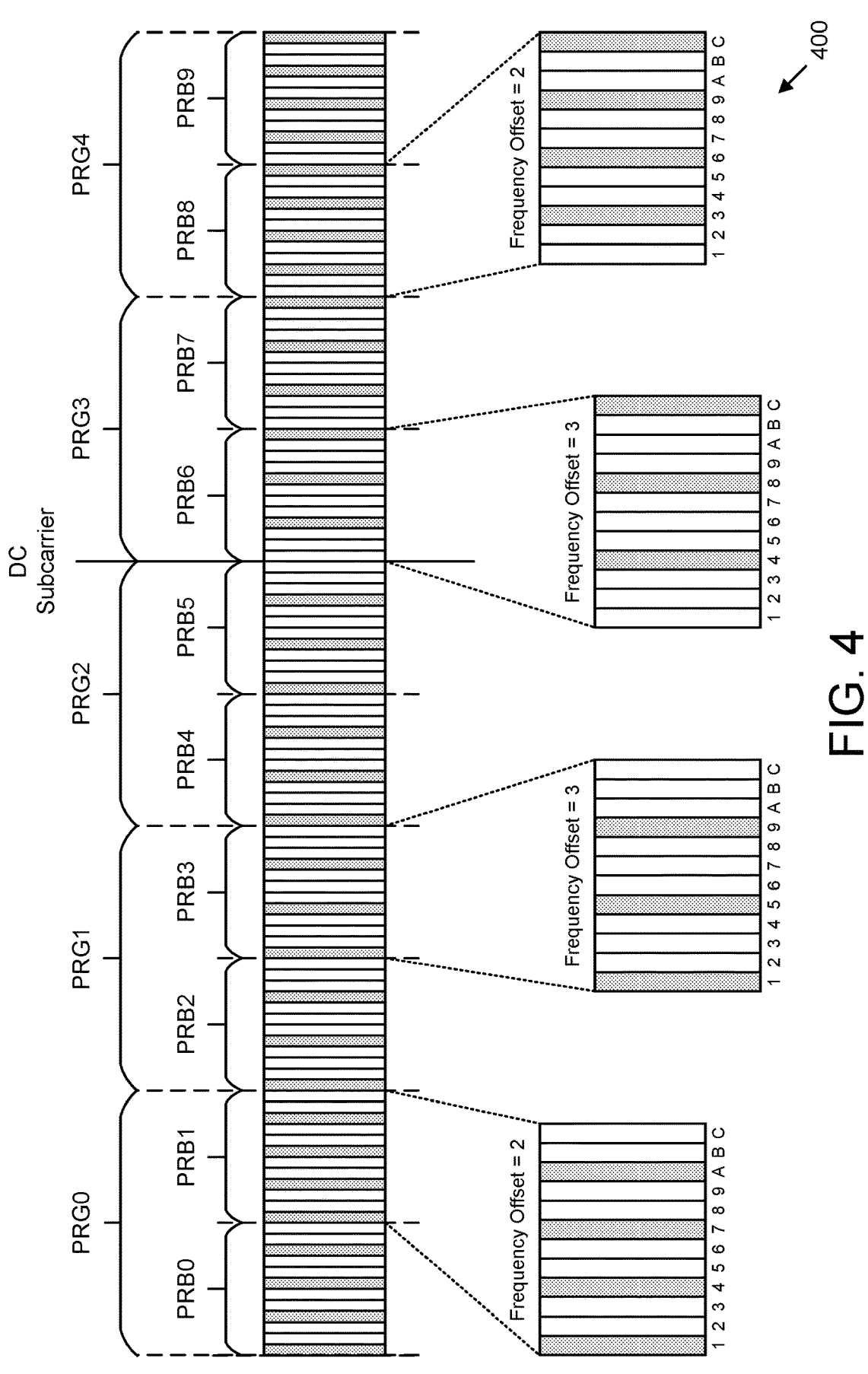
FIG. 4 is a diagram illustrating one embodiment of different frequency offset values across different sets of PRGs (equal size) for entire allocation, showing an odd number of PRGs.

FIG. 4 depicts a second arrangement 400 of irregular subcarrier spacing, according to embodiments of the disclosure. In the second arrangement 400, different frequency offset values are applied across different sets of PRGs, here for an odd number of PRGs. Here, the parameters indicated to the UE 205 include: M=$\{3,2\}$, N=$\{5\}$, where Ni =PRG1, PRG2, PRG3 and $M_1$=3, and where $N_2$=PRG0, PRG4 and $M_2$=2. Because the DC subcarrier is used as a reference around which the irregular spacing is applied, the so for odd allocation (i.e., where the value of N is an odd number) a different approach is used than for the case of even allocation. For the arrangement 400, one value of SCS (gaps between occupied REs) applied to a PRG for an odd number of PRGs in allocation.

As shown in FIG. 4, for M=$\{3,2\}$ and N=$\{5\}$, first 3 PRGs close to the DC subcarrier are associated with frequency offset value 3 and the second 2 PRGs are associated with the frequency offset value 2. For implementation with odd allocation, the UE 205 may be configured and/or indicated with a set 'M'=$\{M_1, \ldots, M_m\}$ of 'm' values of frequency offset and a total 'N' number of PRGs are allocated to the UE 205, where N is an odd number (i.e. N=5 in this example), then the first value $M_1$ in set 'M' is associated/assigned to the first set of (ceiling function) [N/m] PRGs closest to the DC subcarrier (i.e., PRG2, PRG3 and PRG1 in this example), second value $M_2$ in set 'M' is associated to second set of adjacent (floor function) [N/m] PRGs further away from the DC subcarrier (i.e. PRG0 and PRG4 in this example) and so on. In this case, all the allocated PRGs are associated with a frequency offset value.

The second arrangement 400 depicts a variant of the first solution. For PRG1 and PRG2, the frequency offset value of '3' is applied, such that only 3 REs are occupied, and the other REs are empty. Note that the pattern of empty/occupied REs in PRG1 is a mirror of the pattern in PRG2, where in each PRB the REs closest to the DC subcarrier are empty such that the REs immediately adjacent to the DC subcarrier are empty. For PRG0 and PRG3, the frequency offset value of '2' is applied, such that only 4 REs are occupied, and the other REs are empty. Note that the pattern of empty/occupied REs in PRG0 is a mirror of the pattern in PRG3, where in each PRB the REs closest to the DC subcarrier are empty.

Figure 5:
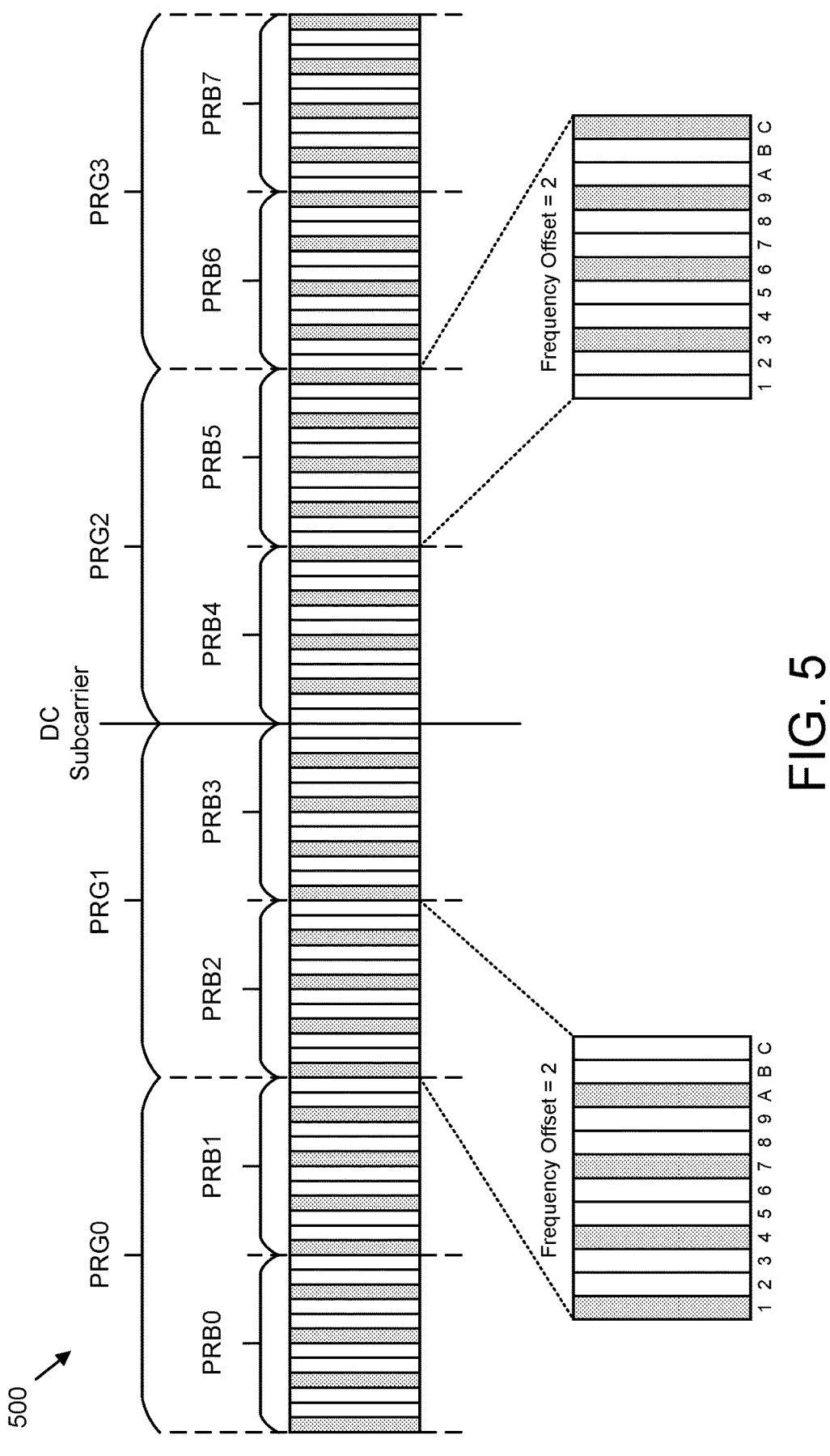
FIG. 5 is a diagram illustrating one embodiment of single frequency offset value across entire allocation.

FIG. 5 depicts a third arrangement 500 of active subcarriers to achieve single frequency offset value across different sets of PRGs for the entire allocation. Here, the parameters indicated to the UE 205 include: M=$\{2\}$, N=$\{4\}$, where N=PRG0, PRG1, PRG2, PRG3, and M=2. According to an alternative implementation, the UE 205 may be configured and/or indicated with only a single value in M is configured. In such embodiments, all the PRGs are associated with same frequency offset, e.g., as shown in FIG. 5 where M=2 for all PRGs.

Thus, for PRG0, PRG1, PRG2 and PRG3, the frequency offset value of '2' is applied, such that only 4 REs are occupied, and the other REs are empty. Note that the pattern of empty/occupied REs in PRG0 and PRG1 is a mirror of the pattern in PRG2 and PRG3, where in each PRB the REs closest to the DC subcarrier are empty. The third arrangement 500 is another variant of the first solution.

Figure 6:
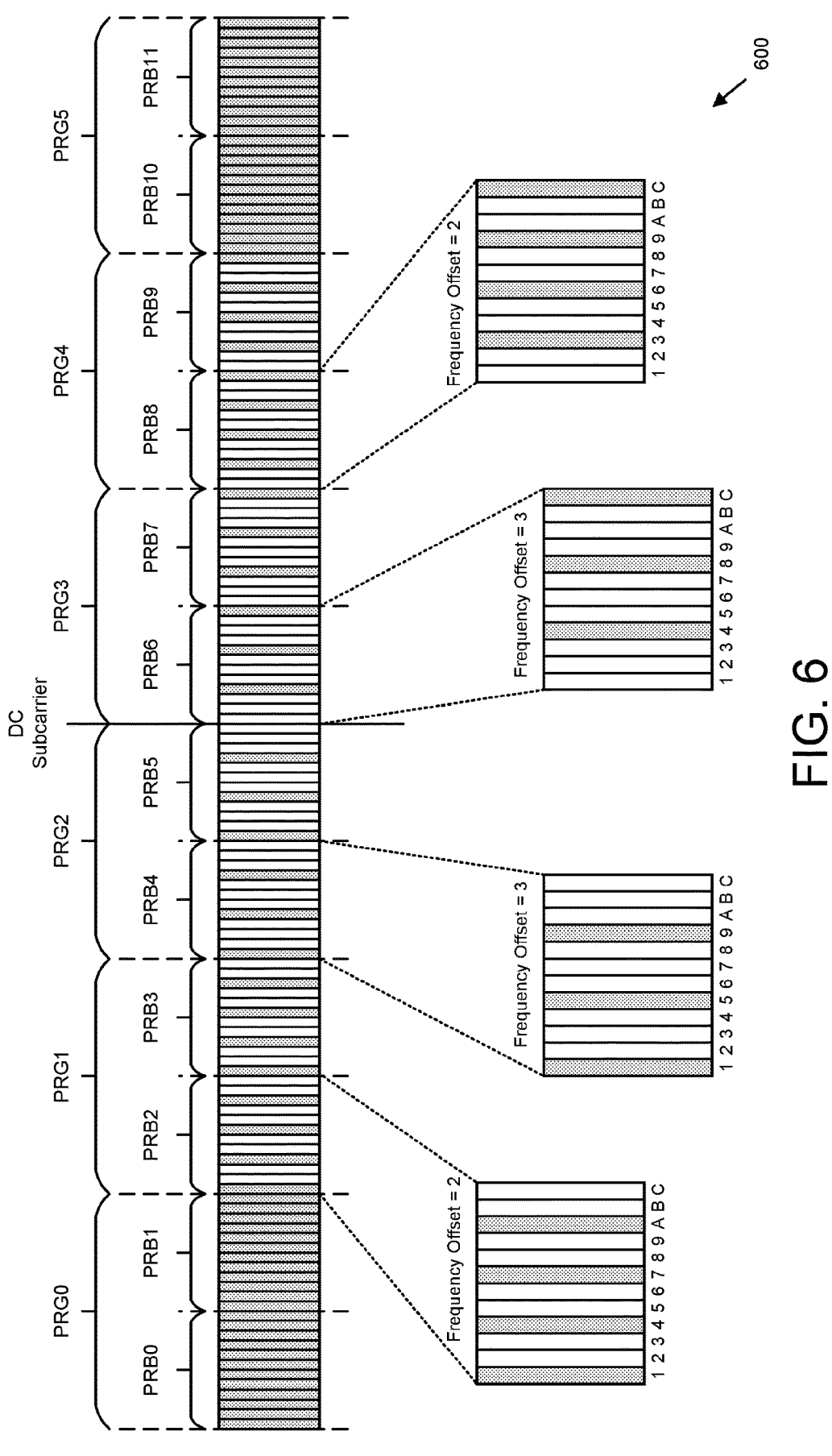
FIG. 6 is a diagram illustrating one embodiment of different frequency offset values across different sets of PRGs (equal size) for partial allocation.

FIG. 6 depicts a fourth arrangement 600 of active subcarriers to achieve different frequency offset values across different sets of PRGs (e.g., of equal size) for a partial allocation. Here, the parameters indicated to the UE 205 include: M=$\{3,2\}$, N=$\{6\}$, K=$\{4\}$, where $K_1$=PRG2, PRG3 and $M_1$=3, and where $K_2$=PRG1, PRG4 and $M_2$=2.

According to a second solution, if multiple values of irregular subcarrier spacing or frequency offset are configured or indicated to the UE 205 and if PRG size is determined as one of the values that is not wideband, and also 'K' number of PRGs are configured and/or indicated to the UE 205, then only a single frequency offset value is applied to multiples of PRG or alternatively a single PRG cannot have more than one value of frequency offset within the 'K' PRGs closest to the DC subcarrier.

In one example implementation of the second solution, the UE 205 may be configured and/or indicated with: a set 'M' of 'm' values of frequency offset, a total 'N' number of PRGs are allocated to the UE 205, and 'K' number of PRGs within which the frequency offset values are applied. Accordingly, the first value '$M_1$' is associated/assigned to a first set of (ceiling function) [K/m] PRGs closest to the DC subcarrier, the second value '$M_2$' is associated/assigned to a second set of adjacent [K/m] PRGs further away from the DC subcarrier, and so on. Moreover, N-K number of PRGs are not associated with any of the value of set 'M' (i.e., the irregular subcarrier spacing is not applied to these PRGs).

As shown in FIG. 6, for M=$\{3,2\}$, N=$\{6\}$ and K=$\{4\}$, first 2 PRGs close to the DC subcarrier are associated with frequency offset value 3, second 2 PRGs with frequency offset value 2 and the third 2 PRGs have no frequency offset. Thus, the configured/indicated irregular subcarrier spacing is not applied to PRG0 and PRG5. For PRG2 and PRG3, the frequency offset value of '3' is applied, such that only 3 REs are occupied, and the other REs are empty. Note that the pattern of empty/occupied REs in PRG2 is a mirror of the pattern in PRG3, where in each PRB the REs closest to the DC subcarrier are empty such that the REs immediately adjacent to the DC subcarrier are empty. For PRG1 and PRG4, the frequency offset value of '2' is applied, such that only 4 REs are occupied, and the other REs are empty. Note that the pattern of empty/occupied REs in PRG1 is a mirror of the pattern in PRG4, where in each PRB the REs closest to the DC subcarrier are empty.

Figure 7:
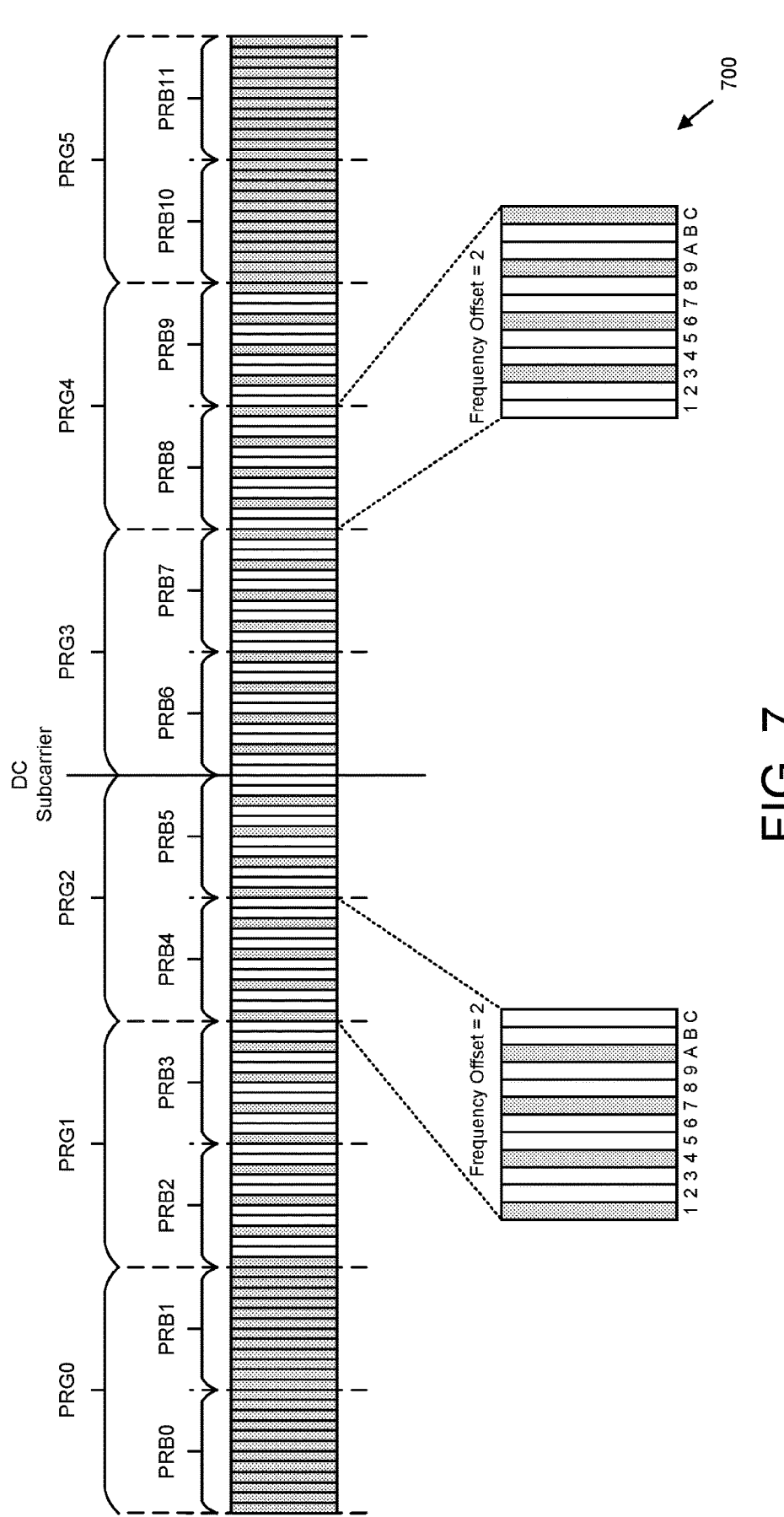
FIG. 7 is a diagram illustrating one embodiment of single frequency offset value across partial allocation.

FIG. 7 depicts a fifth arrangement 700 of active subcarriers to achieve single frequency offset value across different sets of PRGs for a partial allocation. The fifth arrangement 700 is a variant of the second solution, discussed above. Here, the parameters indicated to the UE 205 include: M={2}, N={6}, K={4}, where K=PRG1, PRG2, PRG3, PRG4 and M=2. Thus, the configured/indicated irregular subcarrier spacing is not applied to PRG0 and PRG5.

In another example implementation of the second solution, the UE 205 may be configured and/or indicated with only a single value in set M is configured, then all the PRGs are associated with same frequency offset as shown in FIG. 7, where M={2}, N={6} and K={4}. For PRG1, PRG2, PRG3, PRG4, the frequency offset value of '2' is applied, such that only 4 REs are occupied, and the other REs are empty. Note that the pattern of empty/occupied REs in PRG1 and PRG2 is a mirror of the pattern in PRG3 and PRG4, where in each PRB the REs closest to the DC subcarrier are empty.

Figure 8:
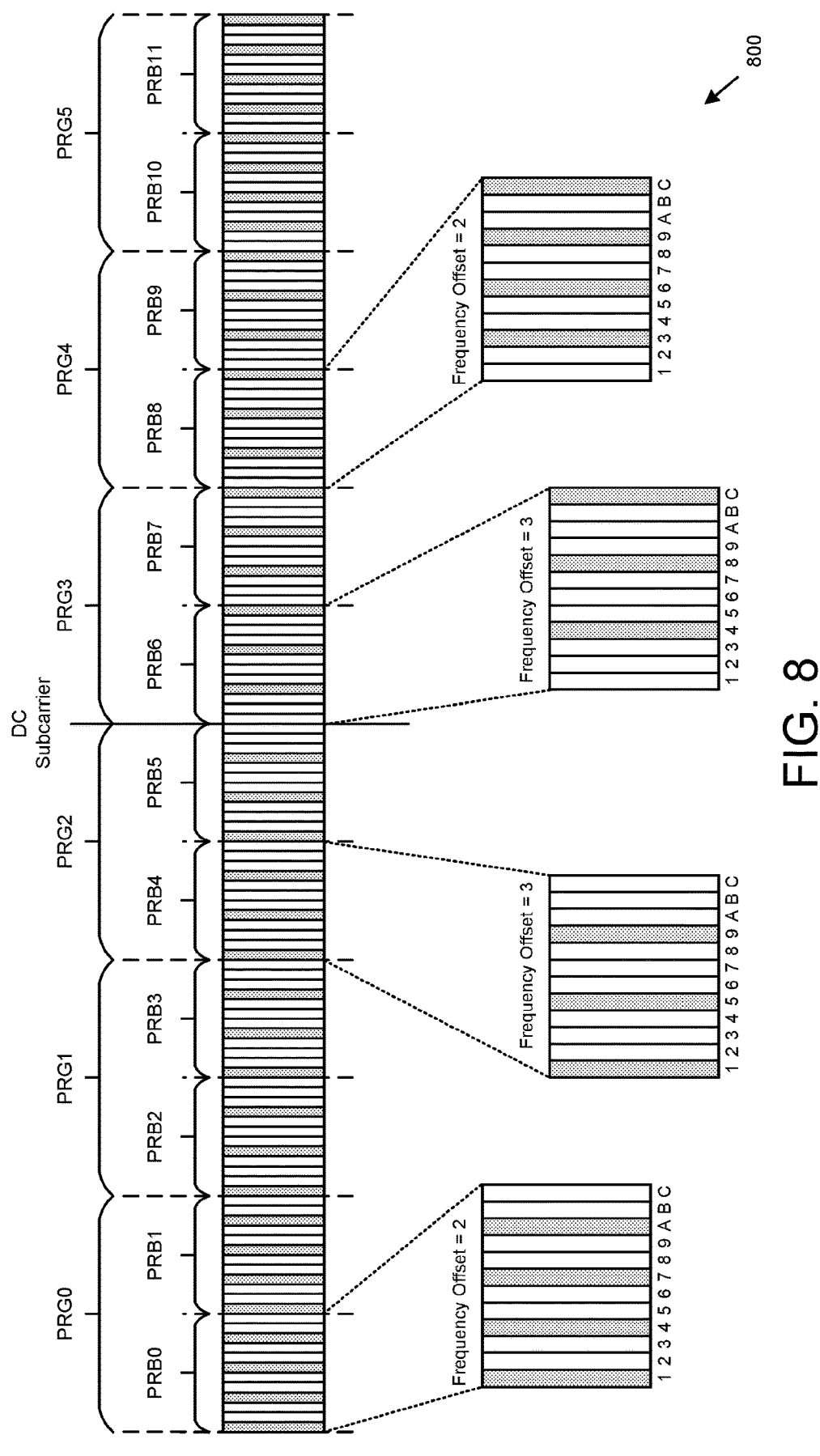
FIG. 8 is a diagram illustrating one embodiment of different frequency offset values across different sets of PRGs (different size)

FIG. 8 depicts a sixth arrangement 800 of active subcarriers to achieve different frequency offset values across different sets of PRGs, e.g., of different size. Here, the parameters indicated to the UE 205 include: M={3,2}, N={6}, K={4,2} where $K_1$=PRG1, PRG2, PRG3, PRG4 and $M_1$=3, and where $K_2$=PRG0, PRG5 and $M_2$=2.

According to a third solution, if multiple values of irregular subcarrier spacing or frequency offset are configured/indicated to the UE 205 and if PRG size is determined as one of the values that is not wideband, and also each value of frequency offset is indicated and associated with a separate value of the number of PRGs, then only a single frequency offset value is applied to each set of PRG. In other words, a single PRG cannot have more than one value of frequency offset.

In one example implementation of the third solution, a UE 205 may be configured and/or indicated with a set M of 'm' values of frequency offset and also corresponding set K of 'k' values for number of PRGs with respective value of frequency offset (where each set can have same or different size) and a total 'N' number of PRGs are allocated to a UE 205. According to Table 2 (below), the first highest value of frequency offset '$M_1$' (i.e., 3) is associated with the first value of number of PRGs i.e., '$K_1$' (i.e., 4) which is applied to the four closest PRGs to DC subcarrier and the second highest value of frequency offset value '$M_2$' (i.e., 2) is associated with second value of number of PRGs i.e. '$K_1$' (i.e., 2) is applied to the remaining two PRGs that are farthest from the DC subcarrier.

Thus, for PRG1, PRG2, PRG3 and PRG 4, the frequency offset value of '3' is applied, such that only 3 REs are occupied, and the other REs are empty. Note that the pattern of empty/occupied REs in PRG1 and PRG2 is a mirror of the pattern in PRG3 and PRG4, where in each PRB the REs closest to the DC subcarrier are empty such that the REs immediately adjacent to the DC subcarrier are empty. For PRG0 and PRG5, the frequency offset value of '2' is applied, such that only 4 REs are occupied, and the other REs are empty. Note that the pattern of empty/occupied REs in PRG0 is a mirror of the pattern in PRG5, where in each PRB the REs closest to the DC subcarrier are empty.

TABLE 2

| Configuration of Frequency offset and corresponding number of PRGs | |
| --- | --- |
| Frequency Gap/Offset M (number of Subcarriers/REs) | Number of PRGs K |
| 3 | 4 |
| 2 | 2 |

According to a fourth solution, when irregular subcarrier spacing or frequency offset is applied to the REs within a PRG allocated to a UE 205, then the power on the REs that are actually transmitted with data/control or reference signals may be power boosted. Here, the level of power boosting is dependent upon the value of the frequency offset value applied within that PRG. In one example implementation of the fourth solution, the power boosting is determined as ratio between the energy per resource element ("EPRE") when there is no frequency offset and the EPRE when a given frequency offset if applies. For example, according to Table 3, power boosting is applied in terms of values of M (i.e., the number of empty REs forming a gap between occupied REs).

TABLE 3

| Ratio of M = 0 EPRE to M > 0 EPRE | |
| --- | --- |
| Frequency Gap/Offset M (number of Subcarriers/REs) | Power Boosting (dB) |
| 1 | −3 |
| 2 | −4.77 |
| 3 | −6 |
| . . . | . . . |
| M | $10 \log (1/(M + 1))$ |

In an alternate embodiment of the fourth solution, when irregular subcarrier spacing or frequency offset is applied to the REs within a PRG allocated to the UE 205, then the power boosting is applied as the ratio of EPRE between data REs and reference signals REs such as Demodulation Reference Signal ("DM-RS"). In one example implementation of the fourth solution, the data REs for actual transmission are determined based on only the frequency offset applied within a PRG and the DM-RS REs are not impacted by the frequency offset.

In addition to the power boosting because of frequency offset, additional power boosting can be applied as the ratio of EPRE between data and DM-RS that is dependent upon the DM-RS configuration type and the number of CDM groups without data (e.g., Table 4). In another example, the DM-RS REs are also impacted (punctured) by the configured and/or indicated frequency offset and the power boosting is done accordingly considering actual REs with data and DM-RS. For this example, two separate power boosting table could be configured and indicated by the network (e.g., RAN node 210), where one table provides EPRE ratios for data and DM-RS based on frequency offset and another table is existing table for EPRE ratio based on DM-RS configuration.

In another example implementation of the fourth solution, the data REs for actual transmission are determined based on the combination of indicated frequency offset value and the DM-RS configuration (and number of CDM groups without data). In this example, power boosting is applied using a single table with EPRE ratio between data REs and DM-RS that could result from different combinations of frequency offset and DM-RS configuration.

TABLE 4

The ratio of data EPRE to DM-RS EPRE βDMRS [dB] according to the number of DM-RS CDM groups without data

| Number of DM-RS CDM groups without data | DM-RS configuration type 1 | DM-RS configuration type 2 |
|---|---|---|
| 1 | 0 dB | 0 dB |
| 2 | −3 dB | −3 dB |
| 3 | — | −4.77 dB |

In another example, the power boosting is applied as a data-to-reference signal EPRE ratio (the ratio of data EPRE to reference signal EPRE) e.g., the UE 205 assumes for reception of the data or applies for transmission of the data. The data can be e.g., DL PDSCH, UL PUSCH, sidelink PSSCH, etc., and the reference signal can be DM-RS associated with the data. The network (e.g., RAN node 210) may configure a list of data-to-reference signal EPRE ratios (e.g., value list of 0 dB, 3 dB, 4.77 dB, 6 dB) which may be dependent on the irregular subcarrier spacing or frequency offset. So, if there are multiple candidate values for frequency offset are supported, multiple lists of data-to-reference signal EPRE ratios can be configured, one for each frequency offset. In one example, a single or one list of data-to-reference signal EPRE ratio is configured irrespective of the number of candidate values for the frequency offset.

The network (e.g., RAN node 210) may indicate a data-to-reference signal EPRE ratio ($\beta_{DMRS,1}$ (dB)) from the list of data-to-reference signal EPRE ratios (single list or the list associated with the frequency offset of the transmission) to use for the transmission. In another example, the data-to-reference signal EPRE ratio may be determined based on a table or equation which may be specified and based on the frequency offset ($\beta_{DMRS,1}$(dB)) used for the transmission and possibly further be based on the number of DM-RS CDM groups without data and/or the DM-RS configuration type (e.g., from Table 4). For example, the data-to-reference signal EPRE ratio may be $\beta_{DMRS,tot}$(dB)=$\beta_{DMRD,1}$+$\beta_{DMRS}$ (dB) where $\beta_{DMRS,1}$ is the indicated data-to-reference signal EPRE ratio from the list of data-to-reference signal EPRE ratios or the component based on the frequency offset (e.g., βDMRS,1=10log10(1/(M+1))) when the data-to-reference signal EPRE ratio is determined based on a table or equation; and $\beta_{DMRS}$ is the value determined based on the number of DM-RS CDM groups without data and/or the DM-RS configuration type (e.g., from Table 4).

In one example, the data-to-reference signal EPRE ratio may be $\beta_{DMRS,tot}$(dB)=$\beta_{DMRS,1}$(dB) and not be based on $\beta_{DMRS}$(dB)–the factor based on number of DM-RS CDM groups without data and/or the DM-RS configuration type. In one example, the data-to-reference signal EPRE ratio may be constant over the transmission (e.g., resource allocation) irrespective of whether different frequency offsets are used for different PRGs. In another example, the data-to-reference signal EPRE ratio may vary between PRGs with different frequency offsets. In some examples, the data-to-reference signal EPRE ratio may not depend on whether any of DM-RS REs are impacted (punctured) by use of the frequency offset–the network (e.g., RAN node 210) may select the appropriate data-to-DM-RS ratio and/or frequency offset that can be supported based on power budget over the transmission. In cases whether the transmitter is power-limited, it can scale down the transmit power while maintaining the desired data-to-reference signal EPRE ratio.

Regarding NR-U interlacing, it is agreed that for interlace transmission of at least Physical Uplink Shared Channel ("PUSCH") and Physical Uplink Control Channel ("PUCCH"), the following PRB-based interlace design is supported for the case of 20 MHz carrier bandwidth: a) 15 kHz SCS: M=10 interlaces with N=10 or 11 PRBs / interlace; and b) 30 kHz SCS: M=5 interlaces with N=10 or 11 PRBs/interlace. Note that Physical Random Access Channel ("PRACH") design may be considered separately, including multiplexing aspects with PUSCH and PUCCH.

Here, it is assumed that for a given SCS, the following interlace design is supported at least for PUSCH: a) Same spacing (M) between consecutive PRBs in an interlace for all interlaces regardless of carrier bandwidth ("BW"), i.e., the number of PRBs per interlace is dependent on the carrier bandwidth, and b) Point A is the reference for the interlace definition. In certain embodiments, for 15 kHz SCS, M=10 interlaces and for 30 kHz SCS, M=5 interlaces for all bandwidths.

In some embodiments, for interlaced PUSCH transmission in a BWP, X bits of the PUSCH frequency domain resource allocation field are used for indicating which combination of M interlaces is allocated to the UE 205. This applies to PUSCH of the following types: 1) Msg3 PUSCH; 2) PUSCH Scheduled by fallback and non-fallback DCI; and 3) Type 1 and Type 2 Configured Grant PUSCH. For 30 kHz SCS, it is agreed to support X=5 (5-bit bitmap to indicate all possible interlace combinations). For 15 kHz SCS, is it agreed to down-select between the following two alternatives: Alt-1: Support X=10 (10-bit bitmap to indicate all possible interlace combinations); and Alt-2: Support X=6 bits to indicate start interlace index and number of contiguous interlace indices (i.e., RIV) and using remaining up to 9 RIV values to indicate specific pre-defined interlace combinations.

Table 5 shows an example mapping of Resource Indication Value ("RIV") values to indicate specific pre-defined interlace combinations. In certain embodiments, RW values from [0 . . . 54] indicate start interlace index and number of consecutive interlace indices. In certain embodiments, RIV values from [55 . . . 63] indicate the following interlace combinations:

TABLE 5

Map of RIV values to Interlace Combinations

| RIV | Interlace Indexes |
|---|---|
| 55 | 0, 5 |
| 56 | 0, 1, 5, 6 |
| 57 | 1, 6 |
| 58 | 1, 2, 3, 4, 6, 7, 8, 9 |
| 59 | 2, 7 |
| 60 | 2, 3, 4, 7, 8, 9 |
| 61 | 3, 8 |
| 62 | 4, 9 |
| 63 | Reserved |

According to a fifth solution, a UE 205 may be configured (e.g., by RAN node 210) with a plurality of interlacing configurations by configuring multiple set of interlaces and number of Physical Resource Blocks ("PRBs") for each interlace. Based on the configured table corresponding to multiple set of interlace configuration, an index to the table can be either dynamically indicated by a Downlink Control Information ("DCI") codepoint or semi-statically indicated to the UE 205. In one example implementation of the fifth solution, a same value of frequency/offset spacing is applied to the PRBs within an interlace such that Resource Elements ("REs") with data/control or reference signals are equally spaced across all the PRBs.

In another example implementation of the fifth solution, if there are more than one PRGs within an interlace, then multiple values of frequency/offset spacing can be configured and/or indicated where each value corresponds to each of the PRGs within the interlace. In another example, different tables are created based on Resource Indication Value ("RIV") to interlace indices for each interlacing spacing/frequency/offset spacing. In another example, interlacing configuration (spacing between PRB(G), Subcarrier etc.,) to be used for the associated grant is directly signaled in the DCI. In another example, combination of both tables-based and DCI-based could be also used to convey interlace indices and other related interlace configuration such as spacing, etc.

In an alternate embodiment of the fifth solution, the UE 205 may be configured (e.g., by RAN node 210) with a plurality of interlacing configurations by configuring multiple set of interlaces and number of sub-PRBs for each interlace. Based on the configured table corresponding to multiple set of interlace configuration, an index to the table can be either dynamically indicated by a DCI codepoint or semi-statically indicated to the UE 205. In addition, different sub-PRB size can be configured depending on the subcarrier spacing. For example, a to sub-PRB size of 3, 4 or 6 can be configured for SCS spacing of 240 kHz, 480 kHz and 960 kHz, respectively.

In another sub-embodiment of the fifth solution, the RAN node 210 may signal semi-statically the reference point for the start PRB(G)/Subcarrier for each interlaces configured in a carrier/BWP. In one example, the number of interlace configured per Bandwidth Part ("BWP"), corresponding interlacing configuration (as discussed above), reference point for each interlace could be signaled as part of RRC BWP configuration.

In various embodiments, the number of Resource Blocks ("RBs") where the default transmission of data subcarriers is impacted can be configured as a function of SCS as shown in Table 6. In addition, the offset in terms of number of subcarriers between the data subcarriers in the corresponding RBs can also be configured as shown in Table 7. In another implementation, both the tables could be configured as a single configuration to the UE 205.

In another implementation, 'k'" offset between data subcarriers and/or Number of RBs with 'V' offset is also specified as an Information Element ("IE") in RRC BWP dedicated configuration and the PDSCH/PUSCH allocation in that BWP follows specified offset.

TABLE 6

| Number of RBs with fixed offset 'k'" as a function of SCS | |
| --- | --- |
| Subcarrier Spacing | Number of RBs with 'k'" offset between data subcarriers |
| 240 kHz | 8 |
| 480 kHz | 4 |
| 960 kHz | 2 |

TABLE 7

| Number of RBs with variable offset 'k'" as a function of SCS | | |
| --- | --- | --- |
| Subcarrier Spacing | Number of RBs with 'k'" offset | 'k'" offset between data subcarriers |
| 240 kHz | [0-3, 4-7] | [6, 3] |
| 480 kHz | [0-1, 2-3] | [8, 4] |
| 960 kHz | [0, 1] | [12, 6] |

The above embodiments have been described generally in the sense of which RE/RBs are transmitted by the RAN node 210. There are two general flavors how to achieve this, which are particularly relevant for the handling of a transport block and the mapping on resource elements.

Flavor 1 ("Rate matching"): In this flavor, only the resources that are intended for transmission are considered for handling of the transport block. In particular for purposes of rate matching, only the available REs are considered to determine the number of bits and symbols that can be conveyed in the assigned time-frequency resources. With respect to, e.g., FIG. 5, only the occupied REs marked in gray are counted, while the empty REs marked in white are neglected.

While in the example of FIG. 5, the overall 4×8(occupied/gray)+8×8(empty/white)=96 REs are assigned, only the gray 4×8=32 REs are used, which results, e.g., for 16-QAM in 128 bits that can be carried. This flavor achieves the best performance because the rate matching (or its inversion) is using the information that perfectly corresponds to the utilization of the radio resource.

The information on which REs are used, or alternatively the REs that are not used, for the transmission of the transport block needs to be available at the UE 205 (i.e., "assistance information"). If the UE 205 is the receiver, the assistance information is required so that the rate matching process employed by the transmitted can be inverted correctly. Alternatively, if the UE 205 is the transmitter, the assistance information is required so that the rate matching process is done with the correct parameters. The assistance information may be conveyed as part of the resource assignment (e.g., in the PDCCH/DCI carrying the resource assignment), or it may be included in a groupcast/broadcast signal (e.g., carried by DCI format 2_0), by uplink control information ("UCI"), or by means of higher layer signaling such as RRC configuration or MAC control element ("CE").

Flavor 2 ("RE puncturing", "RE muting", "Zero-power RE"): In this flavor, all the assigned resources are considered for handling of the transport block. In particular, for purposes of rate matching, all assigned REs are considered to determine the number of bits and symbols that can be conveyed in the assigned time-frequency resources.

With respect to the example of FIG. 5, the REs marked in gray (occupied) and white (empty) are counted. So, in that figure overall 4×8(occupied/gray)+8×8(empty/white)=96 REs are assigned, which results, e.g., for 16-QAM in 384 bits that can be carried. However, only the symbols carried by the gray REs are actually transmitted. This could be interpreted as puncturing white REs, or muting white REs, or transmitting white REs with zero power. Technically, this flavor achieves a suboptimum performance because the rate matching (or its inversion) is using the information that is inaccurately corresponding to the utilization of the radio resource.

Compared to the information already available as part of the resource assignment, no additional assistance information is necessary at the UE 205 ("flavor 2a"). In case of downlink transmissions, the receiving UE 205 will still process the white REs as usual, which usually implies that only noise/interference is contained in the corresponding symbols, which will deteriorate the decoding performance slightly but is still technically possible (albeit at a higher error probability due to the noise/interference). Likewise, if the UE 205 is the transmitter and mutes the REs, the same applies mutatis mutandis to the RAN node 210 (as receiver).

The performance can be improved in this flavor however if some assistance information is available about the muted (or unmuted) REs ("flavor 2b"). In such a case, the receiver can ignore the corresponding REs for processing, so that no additional noise/interference is picked up by the receiver. In this way, there would only be the suboptimum rate matching performance that deteriorates the decoding compared to the first flavor. The assistance information about the muted REs, or alternatively about the unmuted REs, for the transmission of the transport block may be conveyed as part of the resource assignment (e.g., in the PDCCH/DCI carrying the resource assignment), or it may be included in a groupcast/broadcast signal (e.g., carried by DCI format 2_0), by uplink control information ("UCI"), or by means of higher layer signaling such as RRC configuration or MAC control element.

The benefit of flavor 2b over flavor 2a is the improved decoding performance achieved by not picking up noise/interference from muted REs, at the cost of the required assistance information.

The benefit of flavor 2b over flavor 1 is the more simplified processing, since the rate matching (and its inversion) can be done as if all assigned resources are available, while the muting/nulling of REs can be very simply realized in the processing chain by corresponding setting of input values in the Inverse Fast Fourier Transform ("IFFT") stage, while the drawback is the suboptimum performance of the rate matching (and its inversion).

The benefit of flavor 2a over flavor 1 is the much more simplified processing, since the rate matching (and its inversion) can be done as if all assigned resources are available, while the muting/nulling of REs can be very simply realized in the processing chain by corresponding setting of input values in the IFFT stage. Additionally, flavor 2a does not require any assistance information, so no additional signaling overhead is incurred. The drawback is the worse decoding performance due to the suboptimum rate matching (and its inversion) and the noise/interference being picked up from the muted REs.

In another implementation, one or more of the above flavors can also be configured as part of the IE in RRC BWP dedicated configuration.

In some of the embodiments, the frequency separation/offset (e.g., in terms on number of subcarriers; at least one frequency separation/offset with irregular subcarrier mapping) between (candidate) occupied (e.g., data/control/reference signal REs) subcarriers is determined based on at least one of frequency range of operation, frequency band, subcarrier spacing, modulation order, regulatory requirements (e.g., on bandwidth occupancy requirements), transmit DC subcarrier location (for the DL carrier for each of the numerologies configured in the downlink, for each of the configured bandwidth parts in the uplink), whether the DC subcarrier location is offset by e.g., 7.5 kHz relative to the center of the indicated transmit DC subcarrier location.

In one example, a first frequency separation value is used when the DC subcarrier is offset (e.g., 7.5 kHz) relative to the center of the transmit DC subcarrier, and a second frequency separation value is used when the DC subcarrier is not offset relative to the center of the transmit DC subcarrier.

In another example, the location of the occupied subcarriers is selected such that at least one of the empty or null subcarriers (subcarriers between the occupied subcarriers) coincide with the transmit DC subcarrier location when the location of the transmit DC subcarrier is within the resource grid or carrier. In other words, no occupied subcarrier coincides with the transmit DC subcarrier location when the location of the transmit DC subcarrier is within the resource grid or carrier. This is beneficial as it reduces the impact of local oscillator leakage or DC offset effects due to direct conversion transceivers on subcarriers near the DC subcarrier.

In one example, the occupied subcarrier positions are determined based on the transmit DC subcarrier location (e.g., relative to the transmit DC subcarrier location). In one example, two occupied subcarriers closest to the transmit DC subcarrier are selected such that they are approximately equally spaced from the transmit DC subcarrier location.

For example, for odd number of N null/empty subcarriers between the two occupied subcarriers, (floor function) [N/2] null/empty subcarriers are between each of the occupied subcarrier and the transmit DC subcarrier; and for even number of N null/empty subcarriers between the two occupied subcarriers, N/2 null/empty subcarriers are between a first occupied subcarrier and the transmit DC subcarrier and N/2-1 null/empty subcarriers are between a second occupied subcarrier and the transmit DC subcarrier.

In some examples, the occupied subcarrier positions are determined based on the common reference point A for resource block grids (e.g., relative to the common reference point A) 0—the center of subcarrier 0 of common resource block 0 which coincides with 'point A'.

In some embodiments, the null/empty subcarriers can provide the functionality of phase noise tracking for a receiver. In another example, the phase tracking reference signals ("PTRS") can occupy a subset of the empty/null subcarriers. In one example, with irregular subcarrier mapping, the phase noise (e.g., common phase error) can be estimated based on locations with the larger spacing between subcarriers (e.g., using at least one of the null/empty subcarriers or PTRS between the subcarriers) and phase noise tracking/suppression can be applied to the occupied subcarriers especially where the spacing between subcarriers is reduced. In some examples with irregular subcarrier mapping, a first spacing between subcarriers is used in a first portion of the transmit signal bandwidth or resource block grid, and a second spacing between subcarriers is used in a second portion of the transmit signal bandwidth or resource block grid.

The proposed solutions help to deal with the phase noise effect at high frequency by using low SCS, such that a compromise between the required system performance with the existence of phase noise, cyclic prefix ("CP") and its overhead requirement for dealing with multipath, the Hybrid Automatic Repeat Request ("HARQ") timing and number of HARQ processes gives the system more flexibility. Furthermore, more Signal-to-Noise Ratio ("SNR") is gained by using lower SCS due to the longer OFDM symbols.

On the other hand, using empty REs between active subcarriers with lower SCS will reduce the peak data rate of the system. Therefore, the offset between the subcarriers can be applied only to a few RBs that are close to DC, and hence the spectral efficiency of the system is enhanced.

The example Tables 8A and 8B below shows the peak data rate for different combinations of artificial SCSs with interleaved subcarriers comparing with the default SCS. In this table, RS and other overheads are not considered.

TABLE 8A

| Peak data rate for different subcarrier spacing configurations | | | | |
|---|---|---|---|---|
| Default SCS (kHz) | #RBs, 400 MHz BW w/o Guard | TTI length (µs) | Peak_throughput (64QAM raw) with default SCS µ | Peak_throughput with 2 artificial SCSs (µ'$_1$, µ'$_2$)1/2 #RBs each |
| 240 | ~136 | 62.5 | ~2.2 Gbps | ~1.67 Gbps (240/480) |
| 480 | ~68 | 31.25 | ~2.2 Gbps | ~1.67 Gbps (480/960) |

TABLE 8B

| Peak data rate for different subcarrier spacing configurations | | | | | |
|---|---|---|---|---|---|
| Default SCS (kHz) | #RBs, 400 MHz BW w/o Guard | TTI length (µs) | Peak_throughput with 3 artificial SCSs (µ'$_1$, µ'$_2$, µ'$_3$) 1/3 #RBs each | Peak_throughput with 2 artificial SCSs (µ'$_1$, µ'$_2$) (3/4, 1/4) #RBs | Peak_throughput with 2 artificial SCSs (TI (5/6, 1/6) #RBs |
| 240 | ~136 | 62.5 | ~1.30 Gbps (240/480/960) | ~1.95 Gbps (240/480) | ~2.06 Gbps (240/480) |
| 480 | ~68 | 31.25 | ~1.30 Gbps (480/960/1920) | ~1.95 Gbps (480/960) | ~2.06 Gbps (480/960) |

Figure 9:
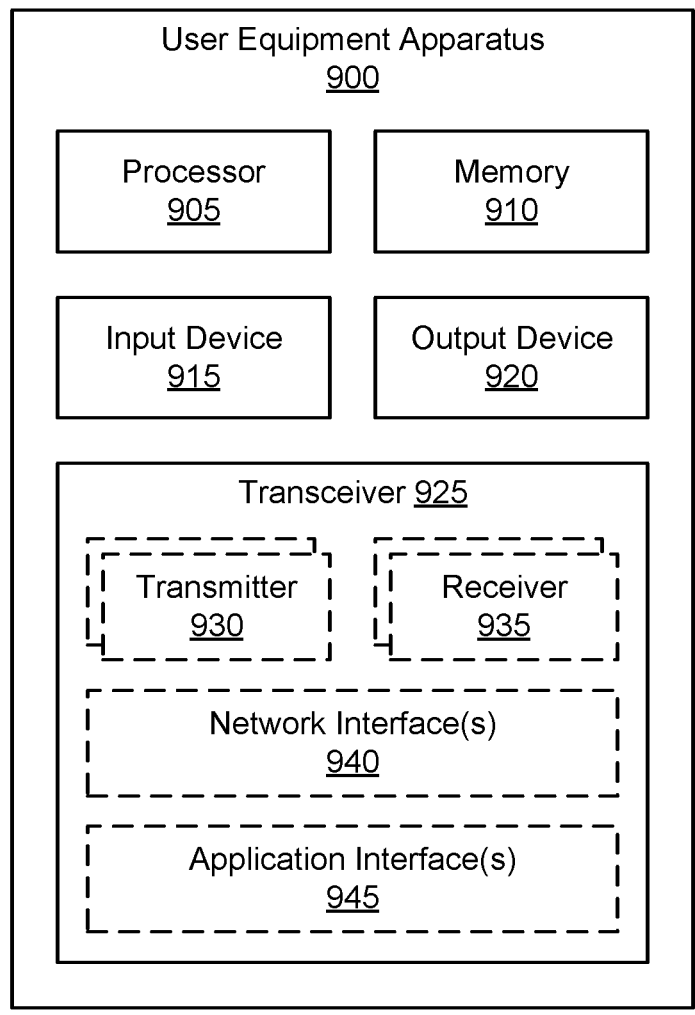
FIG. 9 is a diagram illustrating one embodiment of a user equipment apparatus that may be used for supporting irregular subcarrier spacing.

FIG. 9 depicts a user equipment apparatus 900 that may be used for supporting irregular subcarrier spacing, according to embodiments of the disclosure. In various embodiments, the user equipment apparatus 900 is used to implement one or more of the solutions described above. The user equipment apparatus 900 may be one embodiment of the remote unit 105 and/or the UE 205, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 controls the user equipment apparatus 900 to implement the above described UE behaviors. For example, the processor 905 may receive an indication of at least one value of irregular subcarrier spacing. The processor 905 controls the transceiver 925 to communicate with a RAN by applying the indicated irregular subcarrier spacing to REs in multiple PRGs.

In some embodiments, the indicated irregular subcarrier spacing comprises a frequency offset parameter to indicate a pattern of empty REs interleaved among occupied REs. Here, the occupied REs are used to communicate (e.g., transmit) at least one of: data signals, control signals, and reference signals. In certain embodiments, the processor 905 applies a power boosting to the occupied REs in the PRGs. In such embodiments, the power boosting may be applied as a ratio of energy per resource element between the empty REs in a particular PRG and the occupied REs in the particular PRG.

In certain embodiments, the PRG contains a plurality of REs, each RE centered on a subcarrier, the plurality of REs offset in the frequency domain according to a default subcarrier spacing. In such embodiments, the irregular subcarrier spacing achieves a subcarrier spacing between occupied REs that is greater than the default subcarrier spacing.

In some embodiments, receiving the indication of at least one value of irregular subcarrier spacing includes receiving a configuration from the network. Here, the configuration includes a set of frequency offset values and a set of PRGs allocated to the UE. In some embodiments, the processor 905 determines that a RE is to be used for data transmission based on at least one of: an indicated frequency offset value and a reference signal configuration within a PRG.

In some embodiments, the indication of at least one value of irregular subcarrier spacing comprises sets of PRGs and multiple values of frequency offset, where each frequency offset value is applied to each set of PRGs. In such embodiments, a highest frequency offset value is applied to a set of PRGs closest to the DC subcarrier, where lower frequency offset values are applied to sets of PRGs further away from a DC subcarrier. In some embodiments, the at least one value of irregular subcarrier spacing is applied to an odd number of PRGs adjacent to a DC subcarrier.

In some embodiments, the indication of at least one value of irregular subcarrier spacing comprises a number of PRGs to which the at least one value of irregular subcarrier spacing is applicable. In such embodiments, the irregular subcarrier spacing is not applied to additional PRGs outside the indicated number of PRGs. In some embodiments, the at least one value of irregular subcarrier spacing is implicitly associated with specific PRG indices.

In some embodiments, the processor 905 applies a power boosting to occupied REs in the PRGs. In certain embodiments, the power boosting is applied as a ratio of energy per is resource element between the PRGs where the irregular subcarrier spacing is applied and a PRG where the irregular subcarrier spacing is not applied. In certain embodiments, the power boosting is applied as a ratio of energy per resource element between REs for data transmission and REs for reference signal transmission.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to supporting irregular subcarrier spacing. For example, the memory 910 may store various parameters, panel/beam configurations, resource assignments, policies, and the like as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/ circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
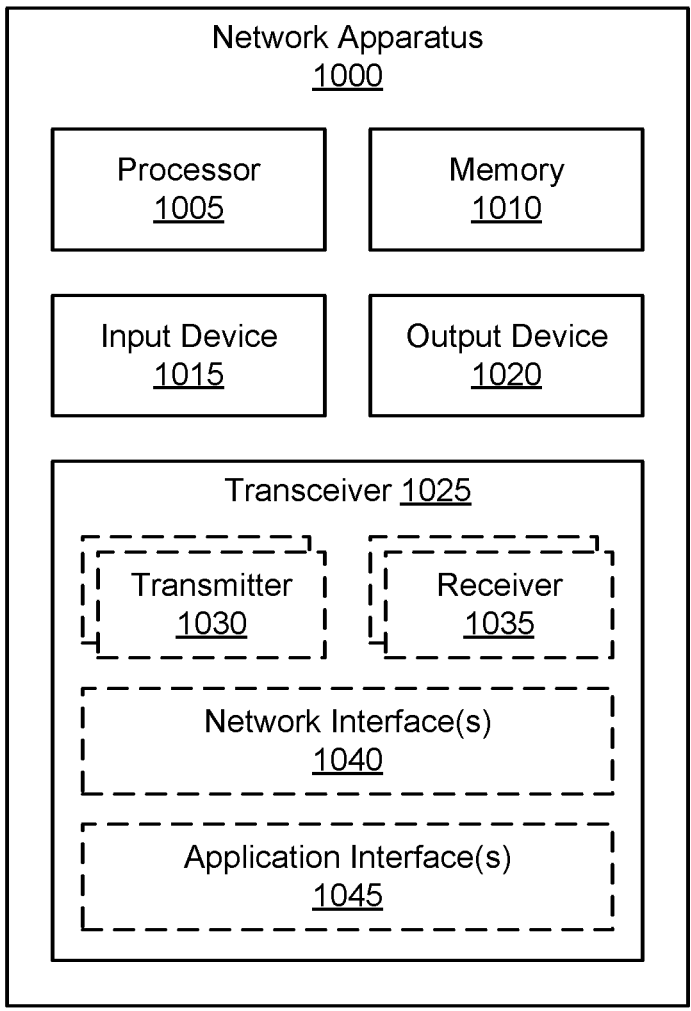
FIG. 10 is a diagram illustrating one embodiment of a network equipment apparatus that may be used for supporting irregular subcarrier spacing.

FIG. 10 depicts a network equipment apparatus 1000 that may be used for supporting irregular subcarrier spacing, according to embodiments of the disclosure. In one embodiment, network equipment apparatus 1000 may be one implementation of a RAN node, such as the base unit 121, the RAN node 210, or gNB, described above. Furthermore, the base network equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network equipment apparatus 1000 may not include any input device 1015 and/or output device 1020. In various embodiments, the network equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network equipment apparatus 1000 is a RAN node (e.g., gNB) that sends UE configurations and receives measurement reports, as described herein.

In such embodiments, the processor 1005 controls the network equipment apparatus 1000 to perform the above described behaviors. When operating as a RAN node, the processor 1005 may include an application processor (also known as "main processor") which manages application-domain and operating system ("OS") functions and a baseband processor (also known as "baseband radio processor") which manages radio functions.

In various embodiments, the processor 1005 controls the network apparatus 1000 to implement the above described RAN behaviors. For example, the processor 1005 may configure a UE with one or more values of irregular subcarrier spacing. In another example, the transceiver 1025 may send an indication to configure a UE of one or more values of irregular subcarrier spacing. In some embodiments, the configuration/indication comprises frequency offset values. Via the transceiver 1025, the processor 1005 also receives data signal REs or control signal REs or reference signal REs on occupied REs, where the pattern of TB using the first UL channel resource, where the UE sends the first TB in response to receiving the feedback information.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to supporting irregular subcarrier spacing. For example, the memory 1010 may store parameters, configurations, resource assignments, policies, and the like, as described above. In certain embodiments, the memory 1010 also stores program code and related data, such as an operating system or other controller algorithms operating on the remote unit 105.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the PLMN and/or RAN, as described herein. Although only one transmitter 1030 and one receiver 1035 are illustrated, the network equipment apparatus 1000 may have any suitable number of transmitters 1030 and receivers 1035. Further, the transmitter(s) 1030 and the receiver(s) 1035 may be any suitable type of transmitters and receivers.

Figure 11:
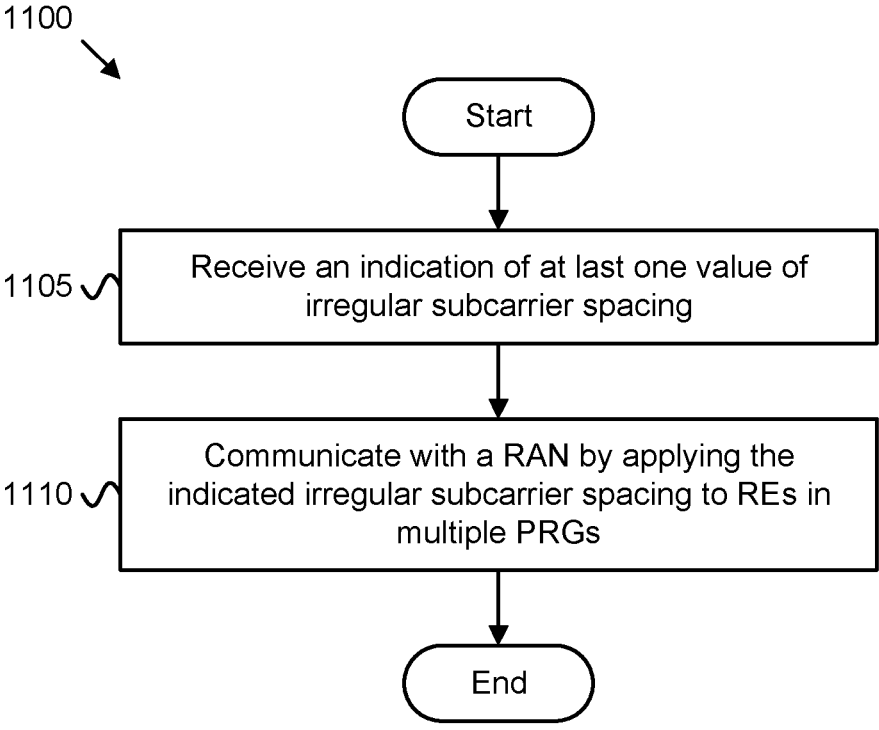
FIG. 11 is a flowchart diagram illustrating one embodiment of a method for supporting irregular subcarrier spacing.

FIG. 11 depicts one embodiment of a method 1100 for supporting irregular subcarrier spacing, according to embodiments of the disclosure. In various embodiments, the method 1100 is performed by a user equipment device in a mobile communication network, such as the remote unit 105, the UE 205, and/or the user equipment apparatus 900, described above. In some embodiments, the method 1100 is performed by a processor, such as a microcontroller, a microprocessor, a CPU, a GPU, an auxiliary processing unit, a FPGA, or the like.

The method 1100 begins and receives 1105 an indication of at least one value of irregular subcarrier spacing. The method 1100 includes communicating 1110 with a RAN by applying the indicated irregular subcarrier spacing to REs in multiple PRGs. The method 1100 ends.

Disclosed herein is a first apparatus for supporting irregular subcarrier spacing, according to embodiments of the disclosure. The first apparatus may be implemented by a user equipment device in a mobile communication network, such as the remote unit 105, the UE 205, and/or the user equipment apparatus 900, described above. The first apparatus includes a processor and a transceiver that communicates with a Radio Access Network ("RAN"). The processor receives an indication of at least one value of irregular subcarrier spacing and applies the indicated irregular subcarrier spacing to resource elements ("REs") in multiple physical resource block groups ("PRGs").

In some embodiments, the indicated irregular subcarrier spacing comprises a frequency offset parameter to indicate a pattern of empty REs interleaved among occupied REs. Here, the occupied REs are used to communicate (e.g., transmit) at least one of: data signals, control signals, and reference signals. In certain embodiments, the processor applies a power boosting to the occupied REs in the PRGs. In such embodiments, the power boosting may be applied as a ratio of energy per resource element between the empty REs in a particular PRG and the occupied REs in the particular PRG.

In certain embodiments, the PRG contains a plurality of REs, each RE centered on a subcarrier, the plurality of REs offset in the frequency domain according to a default subcarrier spacing. In such embodiments, the irregular subcarrier spacing achieves a subcarrier spacing between occupied REs that is greater than the default subcarrier spacing.

In some embodiments, receiving the indication of at least one value of irregular subcarrier spacing includes receiving a configuration from the network. Here, the configuration includes a set of frequency offset values and a set of PRGs allocated to the UE. In some embodiments, the processor determines that a RE is to be used for data transmission based on at least one of: an indicated frequency offset value and a reference signal configuration within a PRG.

In some embodiments, the indication of at least one value of irregular subcarrier spacing comprises sets of PRGs and multiple values of frequency offset, where each frequency offset value is applied to each set of PRGs. In such embodiments, a highest frequency offset value is applied to a set of PRGs closest to the DC subcarrier, where lower frequency offset values are applied to sets of PRGs further away from a direct current ("DC") subcarrier. In some embodiments, the at least one value of irregular subcarrier spacing is applied to an odd number of PRGs adjacent to a DC subcarrier.

In some embodiments, the indication of at least one value of irregular subcarrier spacing comprises a number of PRGs to which the at least one value of irregular subcarrier spacing is applicable. In such embodiments, the irregular subcarrier spacing is not applied to additional PRGs outside the indicated number of PRGs. In some embodiments, the at least one value of irregular subcarrier spacing is implicitly associated with specific PRG indices.

In some embodiments, the processor applies a power boosting to occupied REs in the PRGs. In certain embodiments, the power boosting is applied as a ratio of energy per resource element between the PRGs where the irregular subcarrier spacing is applied and a PRG where the irregular subcarrier spacing is not applied. In certain embodiments, the power boosting is applied as a ratio of energy per resource element between REs for data transmission and REs for reference signal transmission.

Disclosed herein is a first method for supporting irregular subcarrier spacing, according to embodiments of the disclosure. The first method may be performed by a user equipment device in a mobile communication network, such as the remote unit 105, the UE 205, and/or the user equipment apparatus 900. The first method includes receiving, at a UE an indication of at least one value of irregular subcarrier spacing and communicating with a RAN by: applying the indicated irregular subcarrier spacing to REs in multiple PRGs.

In some embodiments, the indicated irregular subcarrier spacing comprises a frequency offset parameter to indicate a pattern of empty REs interleaved among occupied REs. Here, the occupied REs are used to communicate (e.g., transmit) at least one of: data signals, control signals, and reference signals. In certain embodiments, the first method includes applying a power boosting to the occupied REs in the PRGs. In such embodiments, the power boosting may be applied as a ratio of energy per resource element between the empty REs in a particular PRG and the occupied REs in the particular PRG.

In certain embodiments, the PRG contains a plurality of REs, each RE centered on a subcarrier, the plurality of REs offset in the frequency domain according to a default subcarrier spacing. In such embodiments, the irregular subcarrier spacing achieves a subcarrier spacing between occupied REs that is greater than the default subcarrier spacing.

In some embodiments, receiving the indication of at least one value of irregular subcarrier spacing includes receiving a configuration from the network. Here, the configuration includes a set of frequency offset values and a set of PRGs allocated to the UE. In some embodiments, the first method includes determining that a RE is to be used for data transmission based on at least one of: an indicated frequency offset value and a reference signal configuration within a PRG.

In some embodiments, the indication of at least one value of irregular subcarrier spacing comprises sets of PRGs and multiple values of frequency offset, where each frequency offset value is applied to each set of PRGs. In such embodiments, a highest frequency offset value is applied to a set of PRGs closest to the DC subcarrier, where lower frequency offset values are applied to sets of PRGs further away from a DC subcarrier. In some embodiments, the at least one value of irregular subcarrier spacing is applied to an odd number of PRGs adjacent to a DC subcarrier.

In some embodiments, the indication of at least one value of irregular subcarrier spacing comprises a number of PRGs to which the at least one value of irregular subcarrier spacing is applicable. In such embodiments, the irregular subcarrier spacing is not applied to additional PRGs outside the indicated number of PRGs. In some embodiments, the at least one value of irregular subcarrier spacing is implicitly associated with specific PRG indices.

In some embodiments, the first method includes applying a power boosting to occupied REs in the PRGs. In certain embodiments, the power boosting is applied as a ratio of energy per resource element between the PRGs where the irregular subcarrier spacing is applied and a PRG where the irregular subcarrier spacing is not applied. In certain embodiments, the power boosting is applied as a ratio of energy per resource element between REs for data transmission and REs for reference signal transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:
　　receiving, from a base station, a configuration comprising an indication of at least one value of an irregular subcarrier spacing; and
　　communicating with the base station by applying the irregular subcarrier spacing to resource elements ("REs") in multiple physical resource block groups ("PRGs") based on the received indication of the at least one value of the irregular subcarrier spacing,
　　wherein the irregular subcarrier spacing comprises a pattern of multiple empty subcarriers interleaved among multiple occupied REs within a single PRG of the multiple PRGs.

2. The method of claim 1, wherein the irregular subcarrier spacing comprises a frequency offset parameter to indicate a pattern of empty REs interleaved among occupied REs, wherein the occupied REs are used to communicate at least one of:
　　data signals, control signals, and reference signals.

3. The method of claim 2, further comprising applying a power boosting to the occupied REs in the PRGs, wherein the power boosting is applied as a ratio of energy per resource element between the empty subcarriers in a particular PRG and the occupied REs in the particular PRG.

4. The method of claim 2, wherein the PRG comprises a plurality of REs, each RE centered on a subcarrier, the plurality of REs offset in a frequency domain according to a default subcarrier spacing, wherein the irregular subcarrier spacing achieves a subcarrier spacing between occupied REs that is greater than the default subcarrier spacing.

5. The method of claim 1, wherein the indication of at least one value of the irregular subcarrier spacing comprises sets of PRGs and multiple values of frequency offset, where each frequency offset value is applied to each set of PRGs, wherein a highest frequency offset value is applied to a set of PRGs closest to a direct current ("DC") subcarrier, and wherein lower frequency offset values are applied to sets of PRGs further away from the DC subcarrier.

6. The method of claim 1, wherein the at least one value of the irregular subcarrier spacing is applied to an odd number of PRGs adjacent to a direct current ("DC") subcarrier.

7. The method of claim 1, wherein the indication of at least one value of the irregular subcarrier spacing comprises a number of PRGs to which the at least one value of the irregular subcarrier spacing is applicable, wherein the irregular subcarrier spacing is not applied to additional PRGs outside the indicated number of PRGs.

8. The method of claim 1, wherein the at least one value of the irregular subcarrier spacing is implicitly associated with specific PRG indices.

9. The method of claim 1, further comprising applying a power boosting to occupied REs in the PRGs.

10. The method of claim 9, wherein the power boosting is applied as a ratio of energy per resource element between the PRGs where the irregular subcarrier spacing is applied and a PRG where the irregular subcarrier spacing is not applied.

11. The method of claim 9, wherein the power boosting is applied as a ratio of energy per resource element between REs for data transmission and REs for reference signal transmission.

12. The method of claim 1, further comprising determining that a RE is to be used for data transmission based on at least one of: an indicated frequency offset value and a reference signal configuration within a PRG.

13. A User Equipment ("UE") for wireless communication, comprising:
　　at least one memory; and
　　at least one processor coupled with the at least one memory and configured to cause the UE to:
　　　　receive, from a base station, a configuration comprising an indication of at least one value of an irregular subcarrier spacing; and
　　　　communicate with the base station by applying the irregular subcarrier spacing to resource elements ("REs") in multiple physical resource block groups ("PRGs") based on the received indication of the at least one value of the irregular subcarrier spacing,
　　wherein the irregular subcarrier spacing comprises a pattern of multiple empty subcarriers interleaved among multiple occupied REs within a single PRG of the multiple PRGs.

14. The UE of claim 13, wherein the irregular subcarrier spacing comprises a frequency offset parameter to indicate a pattern of empty REs interleaved among occupied REs, wherein the occupied REs are used to communicate at least one of:
　　data signals, control signals, and reference signals.

15. The UE of claim 14, wherein the at least one processor is configured to cause the UE to apply a power boosting to the occupied REs in the PRGs, wherein the power boosting is applied as a ratio of energy per resource element between the empty subcarriers in a particular PRG and the occupied REs in the particular PRG.

16. The UE of claim 14, wherein the PRG comprises a plurality of REs, each RE centered on a subcarrier, the plurality of REs offset in a frequency domain according to a default subcarrier spacing, wherein the irregular subcarrier spacing achieves a subcarrier spacing between occupied REs that is greater than the default subcarrier spacing.

17. The UE of claim 13, wherein the indication of at least one value of the irregular subcarrier spacing comprises sets of PRGs and multiple values of frequency offset, where each frequency offset value is applied to each set of PRGs, wherein a highest frequency offset value is applied to a set of PRGs closest to a direct current ("DC") subcarrier, and wherein lower frequency offset values are applied to sets of PRGs further away from the DC subcarrier.

18. The UE of claim 13, wherein the at least one processor is configured to cause the UE to apply a power boosting to occupied REs in the PRGs.

19. The UE of claim 18, wherein the power boosting is applied as a ratio of energy per resource element between the PRGs where the irregular subcarrier spacing is applied and a PRG where the irregular subcarrier spacing is not applied.

20. The UE of claim 18, wherein the power boosting is applied as a ratio of energy per resource element between REs for data transmission and REs for reference signal transmission.

\* \* \* \* \*